(12) United States Patent
Han et al.

(10) Patent No.: US 10,726,276 B2
(45) Date of Patent: Jul. 28, 2020

(54) METHOD FOR PROVIDING A SIGHT SECURING IMAGE TO VEHICLE, ELECTRONIC APPARATUS AND COMPUTER READABLE RECORDING MEDIUM THEREFOR

(71) Applicant: SAMSUNG ELECTRONICS CO., LTD., Suwon-si, Gyeonggi-do (KR)

(72) Inventors: Seong-won Han, Seoul (KR); Woo-jin Park, Yongin-si (KR); Dae-hyun Ban, Seoul (KR); Kyu-haeng Lee, Seoul (KR); Sangsoon Lim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 11 days.

(21) Appl. No.: 15/715,363

(22) Filed: Sep. 26, 2017

(65) Prior Publication Data
US 2018/0101736 A1 Apr. 12, 2018

(30) Foreign Application Priority Data

Oct. 11, 2016 (KR) ........................ 10-2016-0131320

(51) Int. Cl.
*G06K 9/00* (2006.01)
*G02B 27/01* (2006.01)
(Continued)

(52) U.S. Cl.
CPC ............ *G06K 9/00798* (2013.01); *B60R 1/00* (2013.01); *G02B 27/01* (2013.01); *G02B 27/017* (2013.01);
(Continued)

(58) Field of Classification Search
None
See application file for complete search history.

(56) References Cited

U.S. PATENT DOCUMENTS

| 7,778,770 B2 | 8/2010 | Sakagami et al. |
| 8,941,510 B2 | 1/2015 | Burnison et al. |

(Continued)

FOREIGN PATENT DOCUMENTS

| JP | 2001-283381 | 10/2001 |
| JP | 2004-114709 | 4/2004 |

(Continued)

OTHER PUBLICATIONS

Olaverri-Monreal et al.; "The See-Through System: A VANET-Enabled Assistant for Overtaking Maneuvers;" 2010 IEEE Intelligent Vehicles Symposium; University of California, San Diego, CA, USA; Jun. 21-24, 2010; pp. 123-128. (Year: 2010).*

(Continued)

*Primary Examiner* — Edward Martello
(74) *Attorney, Agent, or Firm* — Nixon & Vanderhye P.C.

(57) ABSTRACT

A method of an electronic apparatus for providing a sight securing image to a vehicle is provided, in which the method for providing a sight securing image includes determining at least one external vehicle from among a plurality of external vehicles, acquiring an external image at the determined external vehicle, acquiring an external vehicle image of the determined external vehicle, generating a sight securing image corresponding to a view obstructed by the external vehicle, by compositing at least part of the acquired external image and at least part of the acquired external vehicle image, and providing the generated sight securing image to a display.

20 Claims, 18 Drawing Sheets

(51) Int. Cl.

| | | |
|---|---|---|
| *G08G 1/0962* | (2006.01) | |
| *G06T 11/00* | (2006.01) | |
| *B60R 1/00* | (2006.01) | |
| *G06T 11/60* | (2006.01) | |
| *G08G 1/01* | (2006.01) | |
| *G08G 1/017* | (2006.01) | |
| *G08G 1/04* | (2006.01) | |
| *G08G 1/16* | (2006.01) | |

(52) U.S. Cl.
CPC .......... *G06K 9/00805* (2013.01); *G06T 11/00* (2013.01); *G06T 11/60* (2013.01); *G08G 1/012* (2013.01); *G08G 1/017* (2013.01); *G08G 1/0112* (2013.01); *G08G 1/04* (2013.01); *G08G 1/0962* (2013.01); *G08G 1/166* (2013.01); *B60R 2300/105* (2013.01); *B60R 2300/20* (2013.01); *B60R 2300/303* (2013.01); *B60R 2300/406* (2013.01); *B60R 2300/60* (2013.01); *B60R 2300/802* (2013.01); *G02B 2027/014* (2013.01); *G02B 2027/0138* (2013.01); *G02B 2027/0141* (2013.01)

(56) References Cited

U.S. PATENT DOCUMENTS

| | | | |
|---|---|---|---|
| 9,180,882 B1 | 11/2015 | Dolgov et al. | |
| 9,361,528 B2 | 6/2016 | Nonaka et al. | |
| 2007/0115138 A1* | 5/2007 | Arakawa | B60R 1/00 340/901 |
| 2009/0231431 A1* | 9/2009 | Grigsby | G06K 9/00791 348/149 |
| 2010/0052944 A1 | 3/2010 | Luke | |
| 2010/0217666 A1* | 8/2010 | Belenguer | G06Q 30/02 705/14.45 |
| 2010/0253593 A1* | 10/2010 | Seder | G01S 13/723 345/7 |
| 2012/0162425 A1 | 6/2012 | Choi et al. | |
| 2013/0083061 A1* | 4/2013 | Mishra | H04N 5/265 345/633 |
| 2014/0019005 A1* | 1/2014 | Lee | G02B 27/01 701/36 |
| 2014/0063064 A1 | 3/2014 | Seo et al. | |
| 2014/0341434 A1 | 11/2014 | Lin et al. | |
| 2015/0200984 A1 | 7/2015 | Jung et al. | |
| 2015/0229886 A1* | 8/2015 | Jung | H04N 7/181 348/148 |
| 2016/0257199 A1* | 9/2016 | Bark | B60K 35/00 |
| 2017/0178514 A1* | 6/2017 | Dry | H04L 67/00 |

FOREIGN PATENT DOCUMENTS

| | | |
|---|---|---|
| JP | 2010-267052 | 11/2010 |
| KR | 10-0885738 | 2/2009 |
| KR | 10-2012-0071203 | 7/2012 |
| KR | 10-2013-0071842 | 7/2013 |
| KR | 10-2014-0031466 | 3/2014 |
| KR | 10-1556581 | 10/2015 |
| WO | WO 2012/131871 | 10/2012 |

OTHER PUBLICATIONS

Search Report and Written Opinion dated Jan. 16, 2018 in counterpart International Patent Application No. PCT/KR2017/010891.
European Extended Search Report dated Aug. 21, 2019 for EP Application No. 17859738.1.

* cited by examiner

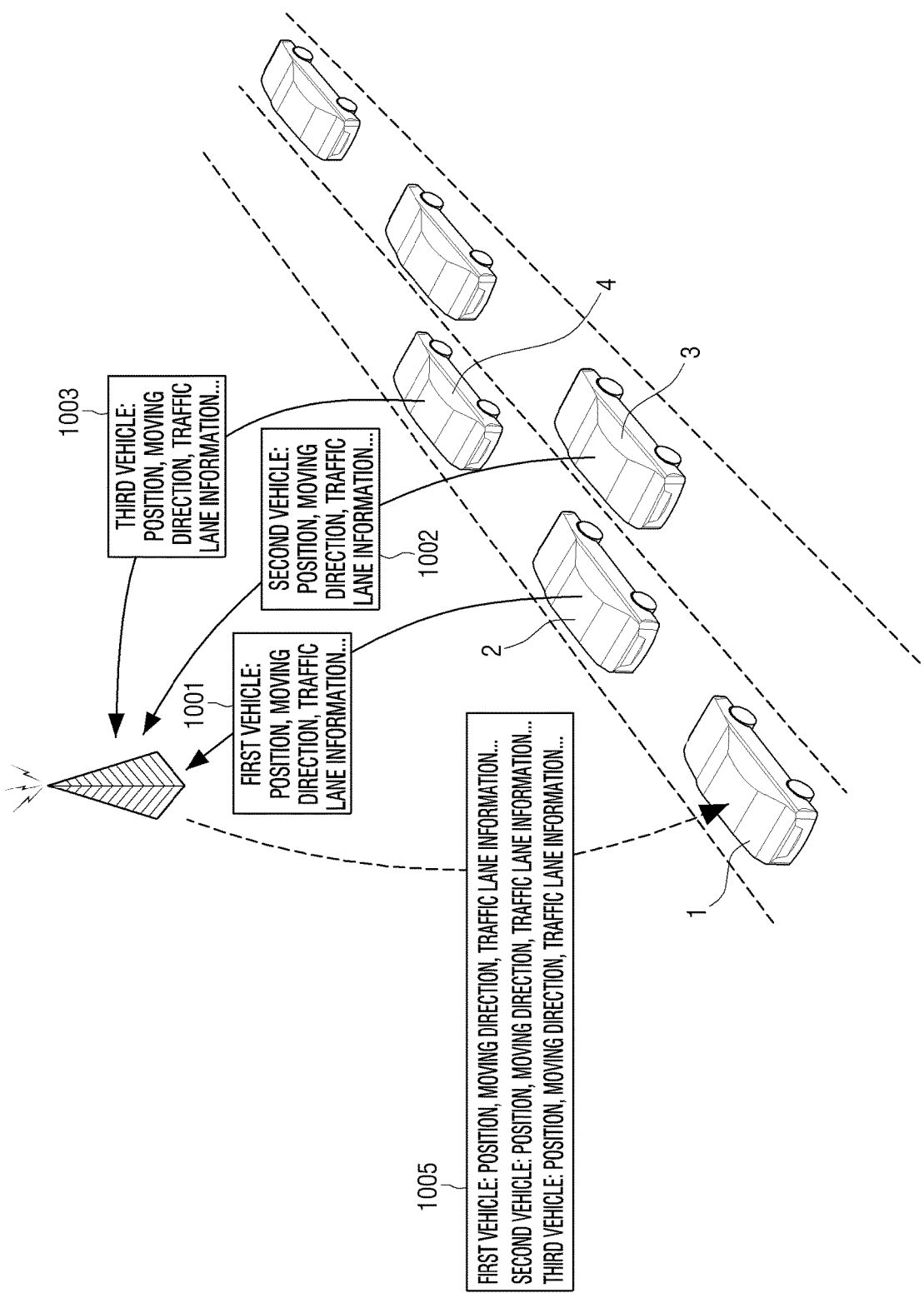

METHOD FOR PROVIDING A SIGHT SECURING IMAGE TO VEHICLE, ELECTRONIC APPARATUS AND COMPUTER READABLE RECORDING MEDIUM THEREFOR

CROSS-REFERENCE TO RELATED APPLICATION

This application is based on and claims priority under 35 U.S.C. § 119 to Korean Patent Application No. 10-2016-0131320, filed on Oct. 11, 2016 in the Korean Intellectual Property Office, the disclosure of which is incorporated by reference herein in its entirety.

BACKGROUND

1. Field

The present disclosure relates generally to a method for providing a sight securing image to a vehicle and an electronic apparatus therefor, and for example, to a method for providing a sight securing image through a display provided on a vehicle and an electronic apparatus therefor.

2. Description of Related Art

Development of vehicles in the past focused on improving main performance of a vehicle such as driving speed, fuel efficiency, and so on. However, current vehicle development places significant emphasis on user convenience and safety improvement. Recently, as safety consciousness on a vehicle is heightened, safety components such as safety belt, air bag, shock absorbing body or the like are widely distributed, and crash test is extended, for example. However, such methods are merely passive means for reducing accident damage.

Accordingly, a new method is necessary, which enables a driver to clearly recognize necessary information for driving as well as out-of-vehicle situation information, and prevents and/or reduces occurrence of an accident due to careless driving of a driver.

SUMMARY

Example embodiments of the present disclosure address the above disadvantages and other disadvantages not described above.

A vehicle (e.g., car) may be provided with a transparent display at a front area in order to secure a sight of the user of the vehicle (e.g., a driver who is driving a car). In this case, when another vehicle outside the vehicle is positioned in front of the vehicle, a situation may occur, in which it is difficult to secure the user's sight because the external vehicle is obstructing the view in the front.

Accordingly, an example aspect of the present disclosure provides a method for providing a sight securing image for securing driver's sight in consideration of an external vehicle positioned in front and a method therefor.

It is to be noted that the technical objectives addressed in the present disclosure are not limited to those mentioned above, and another technical objectives not mentioned herein may be clearly understood by a person skilled in the art from the following disclosure.

According to an example embodiment, a method of an electronic apparatus for providing a sight securing image to a vehicle is provided, which may include an operation of determining at least one external vehicle from among a plurality of external vehicles, acquiring an external image photographed at the determined external vehicle, acquiring an external vehicle image in which the determined external vehicle is photographed, generating a sight securing image corresponding to a sight (view) obstructed by the external vehicle by compositing at least part of the acquired external image and at least part of the acquired external vehicle image, and providing the generated sight securing image to a display.

According to another example embodiment, an electronic apparatus for providing a sight securing image to a vehicle is provided, which may include a vehicle determiner comprising processing circuitry and/or program elements configured to determine at least one external vehicle from among a plurality of external vehicles, an image acquirer comprising processing circuitry and/or program elements configured to acquire external image photographed by the determined external vehicle and external vehicle image in which the determined external vehicle is photographed, an image compositor comprising processing circuitry and/or program elements configured to generate a sight securing image corresponding to a sight (view) obstructed by the external vehicle by compositing at least part of the acquired external image and at least part of the acquired external vehicle image, and an image provider comprising processing circuitry and/or program elements configured to provide the generated sight securing image to a display.

According to another example embodiment, a vehicle is provided, which may include a communicator comprising communication circuitry configured to perform communication with an external vehicle, a camera configured to photograph the external vehicle, an electronic apparatus configured to determine at least one external vehicle from among a plurality of external vehicles, to acquire the external image photographed at the determined external vehicle through the communicator, to acquire the external vehicle image in which the determined external vehicle is photographed through the camera, and to generate a sight securing image corresponding to a view obstructed by the external vehicle by compositing at least part of the external image and at least part of the external vehicle image, and a transparent display configured to display the generated sight securing image.

According to another example embodiment, non-transitory computer readable recording medium may store a program which when executed by a processor causes an electronic apparatus to performs an operation of determining at least one external vehicle from among a plurality of external vehicles, acquiring an external image photographed at the determined external vehicle, acquiring an external vehicle image in which the determined external vehicle is photographed, generating a sight securing image corresponding to a view obstructed by the external vehicle by compositing at least part of the acquired external image and at least part of the acquired external vehicle image, and providing the generated sight securing image to a display.

According to an example embodiment, the sight of the user maneuvering the vehicle may be secured to a far distance. Accordingly, as a user may possibly perform safe driving, accident risk may be greatly reduced.

Further, when a sight securing image is provided according to the augmented reality (AR) method through the transparent display positioned at front, a user may immediately see the sight securing image while driving, and thus, attention distraction may be minimized and/or reduced.

In addition, effects that can be acquired or expected according to an example embodiment of the present disclosure may be directly or implicitly described in a detailed description of an embodiment of the present disclosure. For example, various effects that can be expected according to an example embodiment of the present disclosure will be described in the following detailed description.

BRIEF DESCRIPTION OF THE DRAWINGS

The above and/or other aspects, features and attendant advantages of the present disclosure will become apparent and more readily appreciated from the following detailed description, taken in conjunction with the accompanying drawings, in which like reference numerals refer to like elements, and wherein:

FIGS. 10A, 10B and 10C are diagrams illustrating an example method of an electronic apparatus for determining an external vehicle according to an example embodiment;

DETAILED DESCRIPTION

Figure 1A:
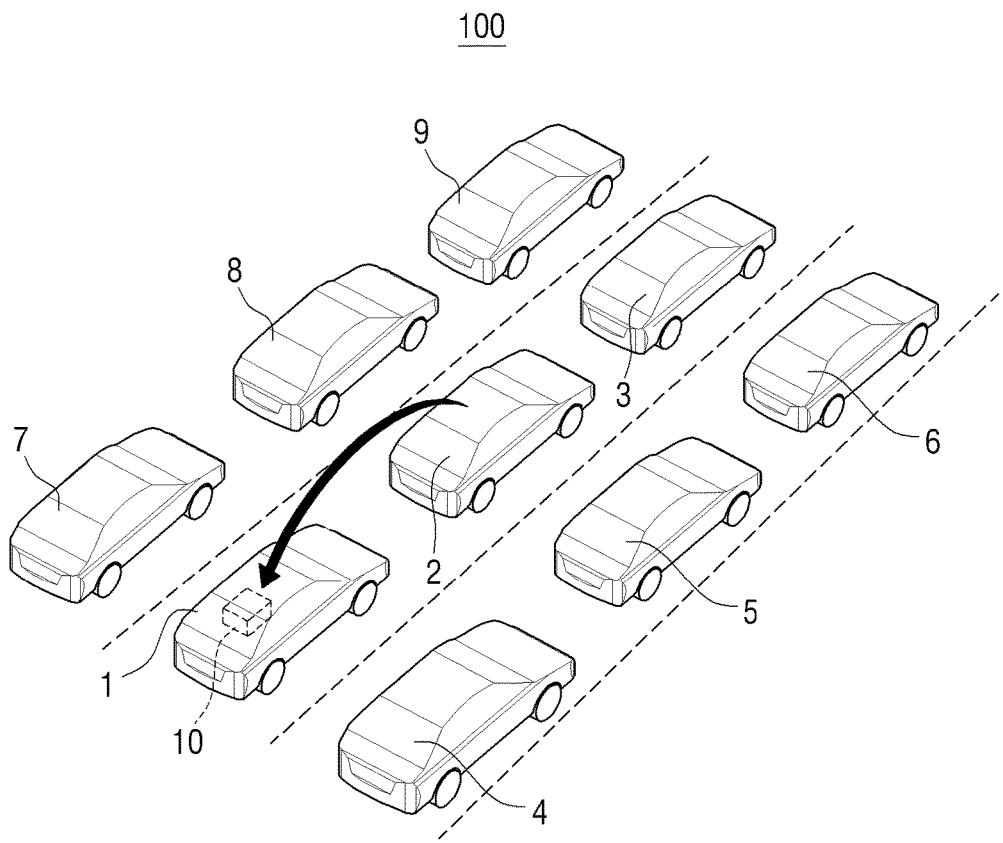
FIGS. 1A, 1B and 1C are diagrams illustrating an example process in which an electronic apparatus provides a sight securing image according to an example embodiment.

The example embodiments of the present disclosure may be diversely modified. Accordingly, various example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail if they might obscure the disclosure with unnecessary detail.

Terms used herein will be briefly explained before providing detailed description of the present disclosure.

Terms used in the present disclosure are selected as general terms which are widely used based on consideration of functions of the present disclosure. However, terms may vary depending on intention of a person skilled in the art, precedents or with the emergence of new technology. Further, there may be terms that are arbitrarily selected in certain circumstances, in which case a meaning thereof will be described in detail when describing the corresponding aspect of the present disclosure. Accordingly, terms used in the present disclosure should be defined based on the meanings of the terms and overall context in the present disclosure, rather than being simply based on the names of the terms.

When a certain element "comprises (includes)" another element, unless specifically stated otherwise, throughout the description, another element may be additionally included, rather than being excluded. Further, in explaining example embodiments, terms such as "module" or "unit" may refer, for example, to a unit that performs at least one function or operation and may be implemented as hardware or software, or as a combination of hardware and software.

In the present disclosure, a "vehicle" may refer, for example, to a transportation means which is boarded or loaded with a person and/or a cargo and moves, such as, for example, a car, an airplane, a motorbike, a (electric) bicycle, an electric wheel chair, a ship, a train, or the like, but is not limited thereto. Further, when a vehicle is a car, the car may include small-, medium-, full-sized car, two-wheeled car, and special car, and may further include a sedan, a van, a truck, a bus, a cargo truck, or the like, but is not limited thereto. Further, "user" as used in the present disclosure may refer, for example, to an operator that drives or maneuvers a vehicle or uses an electronic apparatus of the present disclosure, such as a driver, a pilot, an engineer, or a navigator, or the like, but is not limited thereto. Further, a "vehicle" of a user in the present disclosure may refer to a vehicle mounted or provided with an electronic apparatus of the present disclosure.

The following will describe various example embodiments of the present disclosure by referring to attached drawings so that a person skilled in the art can easily understand and implement the disclosure. However, the description proposed herein is merely an example provided for the purpose of illustration only, and is not intended to limit the scope of the disclosure. Therefore, it should be understood that other equivalents and modifications could be made thereto without departing from the scope of the disclosure. In the following description, functions or elements irrelevant to the present disclosure may not be described for the sake of clarity, and like reference numerals are used for referring to the same or similar elements in the description and drawings.

Figure 1B:
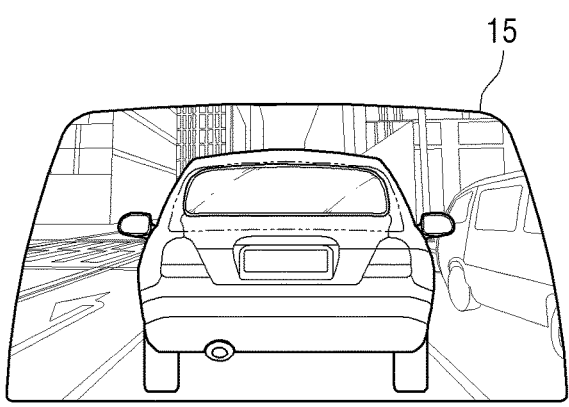
Figure 1C:
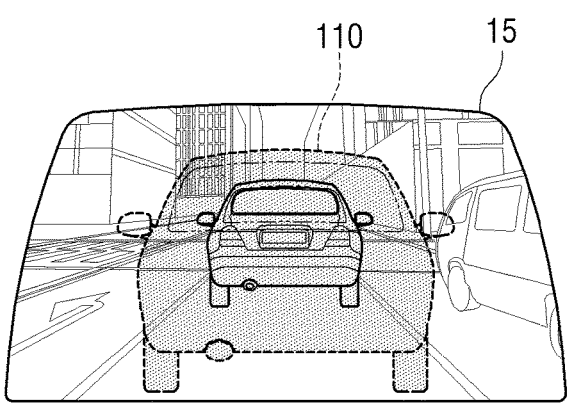

FIGS. 1A, 1B and 1C are diagrams illustrating an example process in which an electronic apparatus provides a sight securing image according to an example embodiment.

Referring to FIG. 1A, a traffic situation 100 may refer to a situation in which a vehicle 1 of a user and a plurality of external vehicles 2 to 9 are in the process of driving, stopping or parking, etc.

The vehicles 1 to 9 may photograph external images using cameras included in the vehicles. In an example, the camera may include, for example, and without limitation, a camera included in the vehicle during manufacture of the vehicle, a camera (e.g., black box camera, etc.) installed on the vehicle by a user or a seller after release by manufacturer, or a camera temporarily installed on the vehicle by a user (e.g., camera mounted on a holder and observing front or back of the vehicle, etc.).

External images photographed with the camera may be images including, for example, and without limitation, objects, topography or roads present outside the vehicle. For example, the external images may include buildings, mountains, other vehicles, pedestrians, traffic lanes, traffic lights, road signs, street trees, or the like, but are not limited thereto.

According to an embodiment, the vehicle 1 of the user may be mounted (provided) with an electronic apparatus 10 to provide a sight securing image.

The electronic apparatus 10 mounted on the vehicle 1 may be a separate system provided in the vehicle 1, or an advanced drive-assisting system such as advanced driver assist system (ADAS), or a part of the assisting system mentioned above, or the like, but is not limited thereto. Further, the electronic apparatus 10 may include a controller such as electronic control unit (ECU) to electrically control various functions related with the driving of the vehicle, or a part of the controller. Further, when the electronic apparatus 10 may be an external apparatus mounted on the vehicle 1. The electronic apparatus 10 may be, for example, and without limitation, a drive-assisting system such as On Board Diagnostics (OBD) connected to vehicle connectors (e.g., OBD terminal, OBD connector, or the like), navigation or the like, or a part of the above.

In addition, the electronic apparatus 10 may be a mobile terminal apparatus positioned or mounted within the vehicle 1, including, for example, and without limitation, a smart phone, a tablet personal computer, a mobile phone, a video phone, an e-book reader, a desktop personal computer, a laptop personal computer, a netbook computer, a personal digital assistant (PDA), a portable multimedia player (PMP), an MP3 player, a mobile medical device, a camera, an internet of things or a wearable device, or the like. The wearable device may include at least one of an accessory type (e.g., watch, ring, bracelet, anklet, necklace, glasses, contact lens, or head-mounted-device (HMD)), fabric or cloth integrated type (e.g., electronic cloth), a body attachment type (e.g., skin pad or tattoo), or a bioimplant circuit, or the like, but is not limited thereto. According to various embodiments, the electronic apparatus 10 may be flexible or a combination of the two or more of the various devices mentioned above. The electronic apparatus 10 according to an embodiment may not be limited to the devices mentioned above. Further, in the present disclosure, the term "user" as used herein may refer to a person or a device (e.g., artificial intelligence electronic apparatus) that uses the electronic apparatus 10.

In this case, as illustrated in FIG. 1B, environment in front may be provided to the user of the vehicle 1 through a transparent display 15 positioned at front of the vehicle 1. In this case, when the external vehicle 2 is positioned in front of the vehicle 1 of the user, it may be difficult to secure the user's sight as the external vehicle 2 is obstructing the view in front.

For example, when a full-sized car such as truck or a car with thickly tinted windows is positioned in front, the user may have a difficulty of checking traffic flows, traffic lights, traffic lanes, signposts, pedestrians, or the like as it is unlikely that the user's sight is secured. For example, when a driver of the full-sized car makes sudden braking due to abnormal circumstance he or she may find, the user in the back may have a problem in immediately sensing and responding to the sudden braking of the full-sized car which typically has a long braking distance.

Accordingly, the electronic apparatus 10 mounted on the vehicle 1 of the user may secure user's sight using a method according to an example embodiment of the present disclosure.

For example, the electronic apparatus 10 may determine at least one external vehicle 2 among a plurality of external vehicles 2 to 9.

For example, in order to determine at least one external vehicle 2, the electronic apparatus 10 may use driving information of a plurality of external vehicles 2 to 9. The method of the electronic apparatus 10 for determining the external vehicle 2 will be specifically described below with reference to FIGS. 10A and 10B.

When the external vehicle 2 is determined, the electronic apparatus 10 may request external images photographed through or by the external vehicle 2 to the determined external vehicle 2, and acquire the external images photographed through the external vehicle 2 from the external vehicle 2.

According to various example embodiments, the electronic apparatus 10 may acquire external images photographed through the external vehicle 2 from an external server (or cloud) (not illustrated) positioned outside the vehicle 2. In other words, when external images photographed at each of the cars may, for example, be collected in the cloud, the electronic apparatus 10 may provide identification information of the determined external vehicle to the external server, and the external server may transmit the photographed external images through the external vehicle 2 corresponding to the identification information to the electronic apparatus 10.

In another process, when the external vehicle 2 is determined, the electronic apparatus 10 may acquire the external vehicle images in which the determined external vehicle 2 is photographed. The external vehicle images may be, for example, images including the external vehicle 2 which is photographed using the camera included in the vehicle 1 of the user. In this case, the external vehicle images may be acquired before, after or almost simultaneously with acquisition of the external images photographed through the external vehicle 2.

When the external images photographed through the external vehicle 2 and the external vehicle images in which the external vehicle 2 is photographed are acquired, the electronic apparatus 10 may composite at least part of the external images and external vehicle images, to generate a sight securing image for providing the sight of a vies which is obstructed by the external vehicle 2.

According to various example embodiments, the electronic apparatus 10 may generate a sight securing image by acquiring, from the external device, additional images corresponding to the obstructed sight (view) as well as the external images and the external vehicle images. For example, the additional images may be road images photographed previously, and these may be the images acquired through an external communication device or surrounding infrastructure.

For example, the external images photographed by the external vehicle 2 may be images photographed at night or images photographed in bad weather (e.g., rough weather). In this case, the electronic apparatus 10 may acquire a sight securing image corresponding to the obstructed sight by compositing two or more of: daytime images previously photographed; additional images photographed in clear weather; external images photographed by the external vehicle; and external vehicle images in which the external vehicle is photographed.

In this case, the external communication device or the surrounding infrastructure from which the electronic apparatus 10 requests external additional images may include, for example, road-side-unit (RSU) installed on roadsides. In an example, the electronic apparatus 10 may recognize RSU as one of base stations or terminals, or the like, but is not limited thereto.

Further, the electronic apparatus 10 may acquire additional images from a V2X server using the vehicle-to-everything (V2X) communication method. The V2X server may, for example, be server for providing the V2X service according to the V2X communication. The V2X communication method is a general term that refers to every form of the communication method that can be applied to the vehicle, and it represents specific communication technology for implementing 'connected vehicle' or 'networked vehicle.' The V2X networking may be largely divided into three: vehicle-to-infrastructure (V2I) communication; vehicle-to-vehicle (V2V) communication; and vehicle-to-pedestrian (V2P) communication, or the like, but is not limited thereto. Technological development of the V2I and the V2V have pursued a main objective of improving road safety, and its convergence with the technological development of the wireless communication for recent several years has enabled various IT additional services to be proposed. For example, the 3rd generation partnership project (3GPP) group is working on the standardization tasks to provide the LTE-Advanced-based V2X communication.

When a sight securing image is generated, the electronic apparatus 10 may provide the generated sight securing image to the display mounted on the vehicle 1.

When the display is a transparent display positioned in front of a car, the provided sight securing image 110 may be displayed on the transparent display 15 positioned in front of the vehicle 1, as illustrated in FIG. 1C.

For example, as illustrated in FIG. 1C, the composited sight securing image may be naturally displayed on the transparent display positioned in front of the user's vehicle 1 with an augmented reality (AR) method. In an example, the AR method may refer, for example, to compositing virtual images with the real world observed by the user and showing the result as one image. The AR method may also be referred to as as a mixed reality (MR), since virtual worlds having additional information are integrated at real time with the real world and viewed as one image.

In addition, the sight securing image may be displayed on a head-up display, a wearable device worn by the user, a dashboard of the display, or the like, but is not limited thereto. Specific examples of a type of the display displaying a sight securing image will be described in greater detail below with reference to FIGS. 13A to 13C.

The user may easily confirm traffic flows, traffic lights, traffic lanes, signposts, pedestrians or the like using the sight securing image. Accordingly, the user is able to perform safe driving.

Figure 2A:
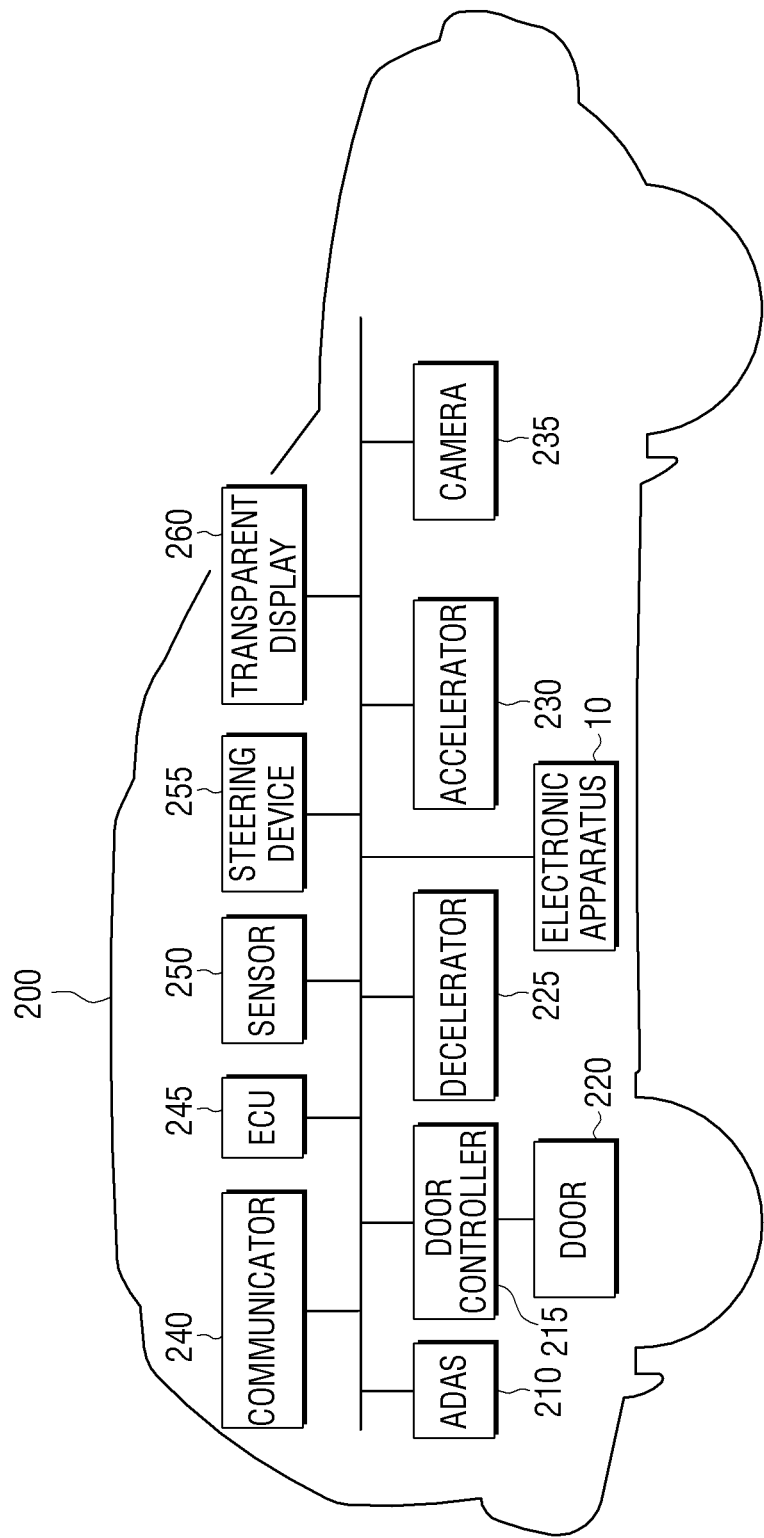
FIG. 2A is a block diagram illustrating an example configuration of a vehicle including an electronic apparatus according to an example embodiment.

FIG. 2A is a block diagram illustrating an example configuration of a vehicle 200 including an electronic apparatus 10 according to an example embodiment.

The vehicle 200 may correspond to the vehicle 1 of the user in FIG. 1. Alternatively, the vehicle 200 may correspond to at least one of the vehicles 2 to 9 in FIG. 1.

In FIG. 2A, the vehicle 200 may include the electronic apparatus 10 according to an embodiment, the ADAS 210 which is the advanced drive-assisting system, the ECU (electronic control unit) 245 which performs overall control related with driving of the vehicle such as driving/braking/steering of the vehicle 200, a door controller 215 for controlling a door of the vehicle 10, the door 220, a steering apparatus 255 (e.g., wheel or the like), an accelerator 230 (e.g., acceleration pedal or the like), a decelerator 255 (e.g., brake pedal), a communicator (e.g., including communication circuitry) 240, a sensor 250, a camera 235, and a transparent display 260.

Although the electronic apparatus 10 is illustrated separately from the ADAS 210 and the ECU 245 which are advanced drive-assisting systems, this is merely one of various example embodiments. According to various example embodiments, the electronic apparatus 10 may be the whole or part of the ADAS 210, or whole or part of the ECU 245.

The ADAS 210 may be named as a drive-assisting system or advanced drive-assisting system of a driver, and may provide various assisting functions related with safety of the car. For example, the ADAS 210 may include an adaptive cruise control function of automatically keeping safety distance by recognizing the vehicle in front, a smart cruise control function of automatically adjusting speed by recognizing distance to the vehicle in front, a traffic jam assist function of keeping certain distance with the vehicle in front in the congested section in the city, an adaptive high beam function of alternately operating an upper light and a lower light according to whether it is night or day or whether there is an oncoming vehicle, a night vision function of sensing and informing in advance the objects unseen by the driver's eyes with an infrared light or thermal light camera, a blind spot warning system of searching and informing whether a vehicle of a blind zone unseen by a driver, and so on.

The ECU 245 may sense state of the vehicle 200 and determine fuel injection quantity and ignition time to keep an engine of the vehicle 200 in order. For example, the ECU 245 may compensate a water temperature sensor, an oxygen sensor or the like and adjust opening and closing rate of an injector based on ignition time manifold absolute pressure (MAP) values and the fuel injection MAP values which are previously set in consideration of the revolution of an engine of the vehicle 200, air suction quantity, suctioning pressure, and accelerator openness.

The communicator 240 may include various communication circuitry and perform communication with an external device positioned externally of the vehicle 200 using long distance communication module or near field communication module.

For example, the communicator 240 may transmit images photographed by the camera 235 to an external device. In this case, the external device may be, for example, the V2X server, an image storing server including external images photographed at the external vehicle, cloud server, or base station. Alternatively, the external device may be another vehicle positioned within certain distance to the vehicle 200.

When a long distance communication module is used, the communicator 240 may perform communication with an external device according to communication standards such as IEEE, 3rd Generation (3G), 3GPP, Long Term Evolution (LTE), global positioning system (GPS), or the like, but is not limited thereto. When the near field communication module is used, the communicator 240 may perform communication with an external device according to communication standards such as Wi-Fi, Bluetooth, NFC, Zigbee, Picocast, or the like, but is not limited thereto.

Further, when communication is performed with a wired communication method, the communicator 240 may use, for example, 20-pin connector, 16-pin connector, RJ45 connector, or USB connector, or the like, but is not limited thereto. The communicator 240 may perform communication according to communication protocols such as On-Board Diagnosis Version 1 (OBD-1), OBD-2, European On-Board Diagnosis (EOBD), Korean On-Board Diagnosis (KOBD), K-Line, Automotive Ethernet, Media Oriented Systems Transport (MOST), FlexRay, RS-232, Controller Area Network (CAN), or the like, but is not limited thereto.

The sensor 250 may sense surrounding environment of the vehicle 200. The sensor 250 may include, for example, an object sensor or a distance sensor such as lidar sensor, radar sensor, ultrasound sensor, vision sensor, infrared sensor, LED sensor, or the like, in order to sense surrounding environment of the vehicle 200.

In addition, the sensor 250 may further include, for example, and without limitation, at least one sensor among an acceleration sensor, a gyro sensor, an illuminance sensor, a proximity sensor, a pressure sensor, a noise sensor (e.g., microphone), a video sensor (e.g., camera module), a temperature sensor, a shock sensor, a tilt sensor, a 3-axis magnetic sensor, a voice recognizing sensor, or a timer, or the like.

Further, the sensor 250 may be implemented as a part of the electronic apparatus 10 or a separate device. Meanwhile, in the present disclosure, sensing the surrounding environment of the vehicle 200 may include not only directly sensing at the electronic apparatus 10, but also receiving sensing results through the sensor 250 included separately from the electronic apparatus 10.

In addition, the sensor 250 may acquire state information such as fuel state information, engine state information (engine state, engine oil state, timing belt state information), tire information (tire wear or warpage degree, etc.), driving speed information, driving direction information, direction indication, or the like, but is not limited thereto. Further, the sensor 250 may determine whether it is day or night through the illuminance sensor and the sensor 250 may acquire illuminance information according to brightness degree of the day or direction of the user's sight.

The camera 235 may, for example, be provided for video signal input, and processes video frames such as still images or video acquired by the image sensor. The video frames processed in the camera 235 may be stored in a memory or transmitted to an external apparatus or an external device through the communicator 240. Two or more cameras 235 may be provided according to various example implementations. For example, the camera 235 may be implemented as various forms such as front camera, back camera, left side camera, right side camera, inner camera, black box camera or the like. Further, the camera 235 may include an infrared camera.

The camera 235 may acquire background information such as objects, topography, roads or the like which are present externally of the vehicle. In other words, the camera 235 may photograph buildings, mountains, other vehicles, pedestrians, traffic lanes, headlights, street trees or the like which are positioned within certain distance from the vehicle 200.

The transparent display 260 may refer, for example, to an image display apparatus having a form in which the back of the screen is seen through. The transparent display may comprise transparent elements, and may adjust transparency by adjusting light transmittance of the transparent elements or adjust transparency by adjusting RGB values of each pixel.

The transparent display 260 may display a sight securing image according to an example embodiment.

According to various example embodiments, the transparent display 260 and a touchpad may form an inter-layer structure to form a touch screen. In this case, the transparent display 260 may be used as input device as well as output device. The transparent display 260 may include at least one of a liquid crystal display, a thin film transistor-liquid crystal display, an organic light-emitting diode, a flexible display, and a 3D display, or the like, but is not limited thereto. Further, there may be two or more transparent displays 260 according to implementation of the vehicle 200. For example, the transparent display 260 may be provided to correspond to a front window, a side window, and a rear window of the vehicle 200.

Because the transparent display 260 comprises transparent elements, the electronic apparatus 10 may adjust transparency of the transparent display 260 or RGB values of each pixel by adjusting light transmittance of the transparent elements.

Meanwhile, when the transparent display 260 is in such a form in which the organic light-emitting diode and the liquid crystal display are coupled, the electronic apparatus 10, which may keep transparent glass state normally, may supply power to the transparent display 260 so that the liquid display blocks the light, thus turning the transparent display 260 to opaque state.

The transparent display 260 may be implemented in various forms such as, for example, and without limitation, transparent liquid crystal display, transparent thin-film electroluminescent panel, transparent OLED, projecting device, or the like. The transparent LCD may refer, for example, to a transparent display implemented by removing a backlight unit from the currently-available LCD device, by using a pair of polarized panels, optical films, transparent thin-film transistors, transparent electrodes, and so on. While the transparent LCD device has disadvantages of lower transparency due to use of polarized panels or optical films, and lower optical efficiency due to use of surrounding light instead of the backlight unit, it has an advantage that a large scale transparent display can be implemented. The transparent TFEL may refer, for example, to a device using alternate current inorganic thin-film EL display (AC-TFEL) composed of transparent electrodes, inorganic fluorescent material, and insulating films. AC-TFEL is a display that generates light as accelerated electrons pass within the inorganic fluorescent material and excite the fluorescent material. When the transparent display 260 is implemented as transparent TFEL, the electronic apparatus 10 may determine a position to display the image by adjusting electrons so that the electrons are projected to a suitable position. Because the inorganic fluorescent material and the insulating films have transparent characteristics, significantly transparent display can be implemented. The transparent OLED may refer, for example, to a transparent display using OLED which is capable of emitting light itself. Because an organic light-emitting layer is transparent, a transparent display apparatus may be implemented when both electrodes are implemented as transparent electrodes. OLED emits light as electrons and holes are injected from both sides of the organic light-emitting layer and coupled within the organic light-emitting layer. The transparent OLED apparatus may display images on a desired position using the principle described above.

Meanwhile, although not illustrated, the vehicle 200 may further include a memory (not illustrated) storing various programs and data for controlling the vehicle 200. According to an embodiment, at least part of the memory (not illustrated) may be separately provided in the vehicle 200 or may be included in the ECU 245 or the ADAS 210 of the vehicle 200. Alternatively, the memory may be included as one of the components of the vehicle 200, which is electrically connected to the electronic apparatus 10.

The memory (not illustrated) may include an embedded memory or a removable memory, for example. The embedded memory may include, for example, and without limitation, at least one of a volatile memory (e.g., dynamic RAM (DRAM), static RAM (SRAM), synchronous dynamic RAM (SDRAM)), a non-volatile memory (e.g., one time programmable ROM (OTPROM), programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD), or the like.

The removable memory may further include, for example, and without limitation, a flash drive such as compact flash (CF), securedigital (SD), micro-SD (micro securedigital), mini-SD, xD (extreme digital), multi-media card (MMC) or memory stick, or the like.

Programs stored in the memory may be implemented as software, firmware, hardware or any combination of at least two of the above.

At least part of the programs may be implemented (e.g., executed) by the electronic apparatus 10 of the vehicle 200, for example.

For example, and without limitation, the programs may include instructions to determine at least one external vehicle among a plurality of external vehicles, composite at least part of external images photographed by the determined external vehicle and at least part of external vehicle images in which the determined external vehicle is photographed, to generate a sight securing image corresponding to the sight obstructed by the external vehicle, and provide the generated sight securing image to the display.

According to various embodiments, the vehicle 200 may include the communicator 240 for performing communication with an external vehicle, the camera 235 for photographing external vehicle images, the electronic apparatus 10 for determining at least one external vehicle among a plurality of external vehicles, acquiring the external images photographed by the determined external vehicle through the communicator 240, acquiring the external vehicle images in which the external vehicle is photographed through the camera 235, and generating a sight securing image by compositing at least part of the external images and at least part of the external vehicle images, and the transparent display 260 for displaying the generated sight securing image.

Figure 2B:
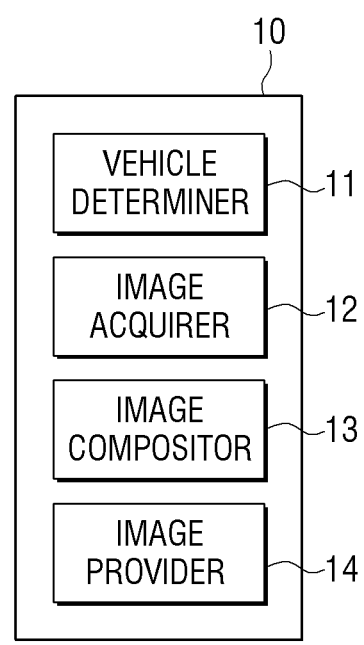
FIG. 2B is a block diagram illustrating an example configuration of an electronic apparatus for providing a sight securing image to a vehicle according to an example embodiment.

FIG. 2B is a block diagram illustrating an example configuration of the electronic apparatus 10 for providing a sight securing image to the vehicle 200 according to an embodiment.

Referring to FIG. 2B, the electronic apparatus 10 may include processing circuitry (e.g., a processor) (not shown). The processor of the electronic apparatus may be configured to provide operations of, for example, and without limitation, a vehicle determiner (e.g., including processing circuitry and/or program elements) 11, an image acquirer (e.g., including processing circuitry and/or program elements) 12, an image compositor (e.g., including processing circuitry and/or program elements) 13, and an image provider (e.g., including processing circuitry and/or program elements) 14.

The vehicle determiner 11 may include processing circuitry and/or program elements configured to determine at least one external vehicle among a plurality of external vehicles. For example, the vehicle determiner may determine the external vehicle based on at least one of: driving information of each of a plurality of external vehicles, distance information of each of a plurality of external vehicles measured with the distance sensor, and identification information of each of a plurality of external vehicles.

The image acquirer 12 may include processing circuitry and/or program elements configured to acquire external images photographed by the determined external vehicle. For example, the image acquirer 12 may acquire the external images through the communicator 240 of FIG. 2A. For example, the image acquirer 120 may acquire the external image from the external vehicle or the externally-located server through the communicator 240 of FIG. 2A.

Further, the image acquirer 12 may acquire the external vehicle images in which the determined external vehicle is photographed. For example, the image acquirer 12 may acquire the external vehicle images through the camera 235 of FIG. 2A.

The image compositor 13 may include processing circuitry and/or program elements configured to composite at least part of the external images and at least part of the external vehicle images to generate a sight securing image corresponding to the sight obstructed by the external vehicle.

For example, the image compositor 13 may overlay at least part of the external vehicle images and at least part of the external images based on common environment information included in both of the external vehicle images and the external images to generate a sight securing image.

The image provider 14 may include processing circuitry and/or program elements configured to provide the generated sight securing image to the display. For example, the image provider 14 may provide the sight securing image to the display 260 of the vehicle 200 of FIG. 2A for display thereof according to the AR method.

According to various example embodiments, in order to acquire external images, the electronic apparatus 10 may further include an image requestor (not illustrated) for providing range information of a range corresponding to the sight obstructed by the external vehicle to the external vehicle or to the externally-located server.

According to various embodiments, the electronic apparatus 10 may further include a request signal receiver (not illustrated) include processing circuitry and/or program elements configured to request a sight securing image. In this case, a signal for requesting the sight securing image may be a signal generated when a region of the display obstructed by the external vehicle is equal to, or greater than a certain ratio of the entire region of the display, or may be a signal generated when user input intended to display the sight securing image is received.

According to various embodiments, the image acquirer 12 may acquire previously photographed additional images corresponding to the obstructed sight from the external device. In this case, the image compositor 13 may generate a sight securing image by compositing at least part of the external images, at least part of the additional images and at least part of the external vehicle images.

According to various embodiments, when the external vehicle is first external vehicle and when the external image photographed by the first external vehicle is first external image, the image acquirer 12 may acquire a second external image photographed by a second external vehicle positioned in front of the first external vehicle. Further, the image compositor 13 may generate a sight securing image by compositing at least part of the first external image, at least part of the second external image, and at least part of the first external vehicle image.

Figure 3:
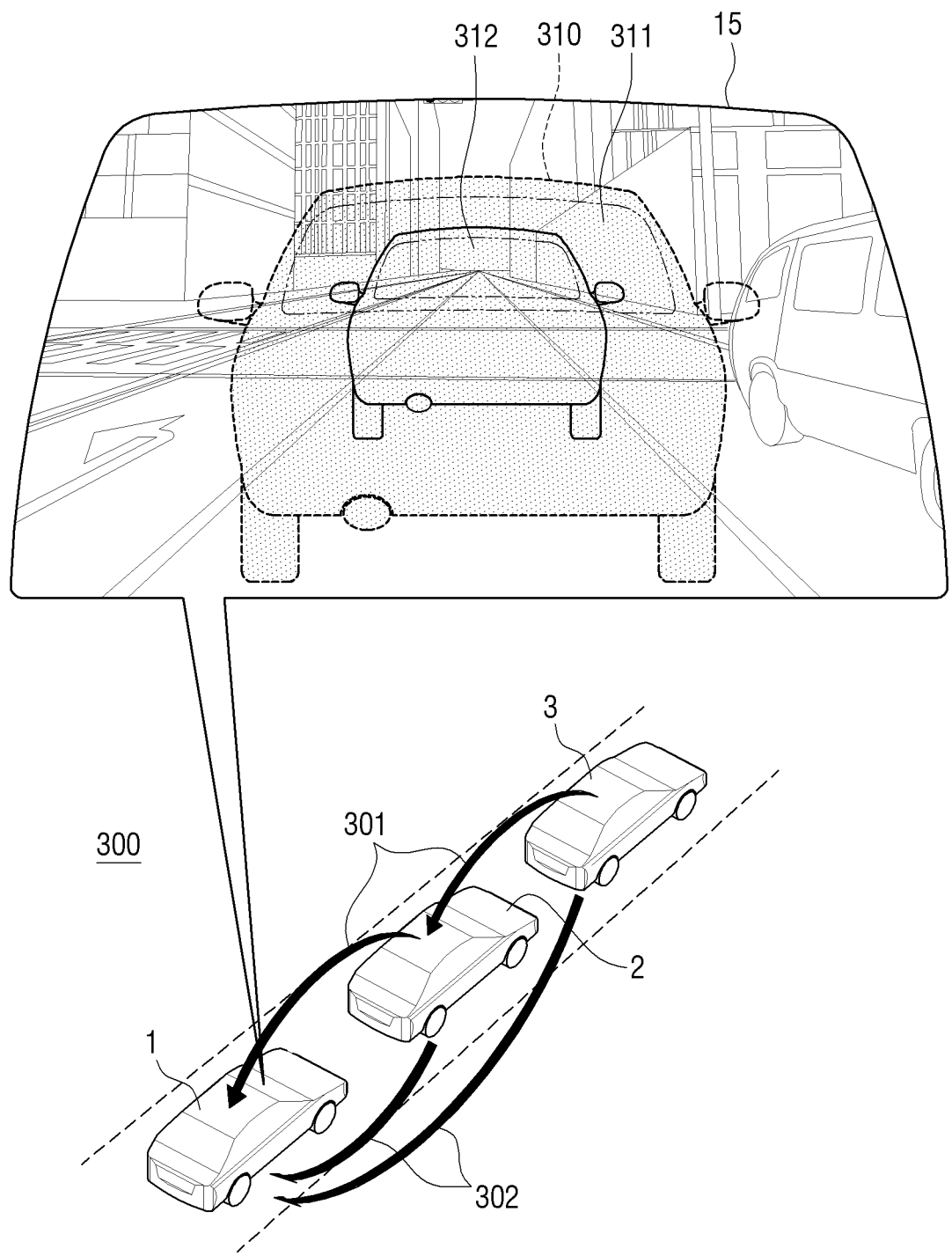
FIGS. 3, 4, 5A, 5B, 6A, 6B, 6C and 6D are diagrams illustrating an example process in which an electronic apparatus provides a sight securing image according to another example embodiment.

FIG. 3 is a diagram illustrating an example electronic apparatus providing a sight securing image according to another example embodiment.

In FIG. 3, the traffic situation 300 may be the situation in which the first and second external vehicles 2, 3 are driving, stopping or parking in front of the user's vehicle 1.

In this case, the vehicles 1, 2 and 3 may photograph external images using the cameras included in the vehicles 1, 2 and 3.

The vehicle determiner 11 of the electronic apparatus 10 mounted on the vehicle 1 of the user may determine at least one first external vehicle 2 to acquire external images.

When the external vehicle 2 is determined, the image acquirer 12 of the electronic apparatus 10 may acquire external images from the first external vehicle 2. Further, the image acquirer 12 may acquire the external images in which the first external vehicle 2 is photographed using the camera of the user's vehicle 1.

In this case, the image acquirer 12 may acquire the second external image photographed at the second external vehicle 3 positioned in front of the first external vehicle 2 as well as the first external image photographed at the first external vehicle 2 right positioned in front of the user's vehicle 1. In this case, the user's vehicle 1, the first external vehicle 2 and the second external vehicle 3 may drive in the same traffic lane.

For example, as shown by 301 of FIG. 3, the first external vehicle 2 may first acquire the external images photographed at the second external vehicle 3. Under this circumstance, when the electronic apparatus 10 requests the external images, the first external vehicle 2 may transmit the external images photographed at the second external vehicle 3 as well as the external images photographed at the first external vehicle 2.

As another example, as shown by 302 of FIG. 3, the electronic apparatus 10 may request external images to each of a plurality of external vehicles 2, 3. In this case, the electronic apparatus 10 may acquire the first external image from the first external vehicle 2, and acquire the second external image from the second external vehicle 3.

The image compositor 13 of the electronic apparatus 10 may generate a sight securing image by compositing at least part of the first external image, at least part of the second external image and at least part of the first external vehicle image. In this case, because the user's vehicle 1, the first external vehicle 2 and the second external vehicle 3 are driving together as they are stitching in the same traffic lane, the image compositor 13 is easily able to overlay and composite the images described above sequentially.

When the sight securing image is generated, the image provider 14 of the electronic apparatus 10 may provide the sight securing image to the display mounted on the vehicle.

For example, as shown in FIG. 3, the sight securing image 310 may be displayed on the transparent display 15 of the user's vehicle 1 according to the AR method. In this case, the sight securing image 310 may include at least part 312 of the second external image as well as at least part 311 of the first external image. Accordingly, since the sight of the user of the vehicle 1 can be secured to a far distance (e.g., greater than a threshold distance, such as, for example, greater than a distance of the vehicle 2 immediately in front of the first vehicle 1), the user may drive more safely.

Meanwhile, when sight securing image is generated, the image compositor 13 may acquire additional images through an external communication device or surrounding infrastructure, and acquire a sight securing image by compositing at least part of the acquired additional image, at least part of the first external image, at least part of the second external image, and at least part of the image in which the first external vehicle is photographed.

Figure 4:
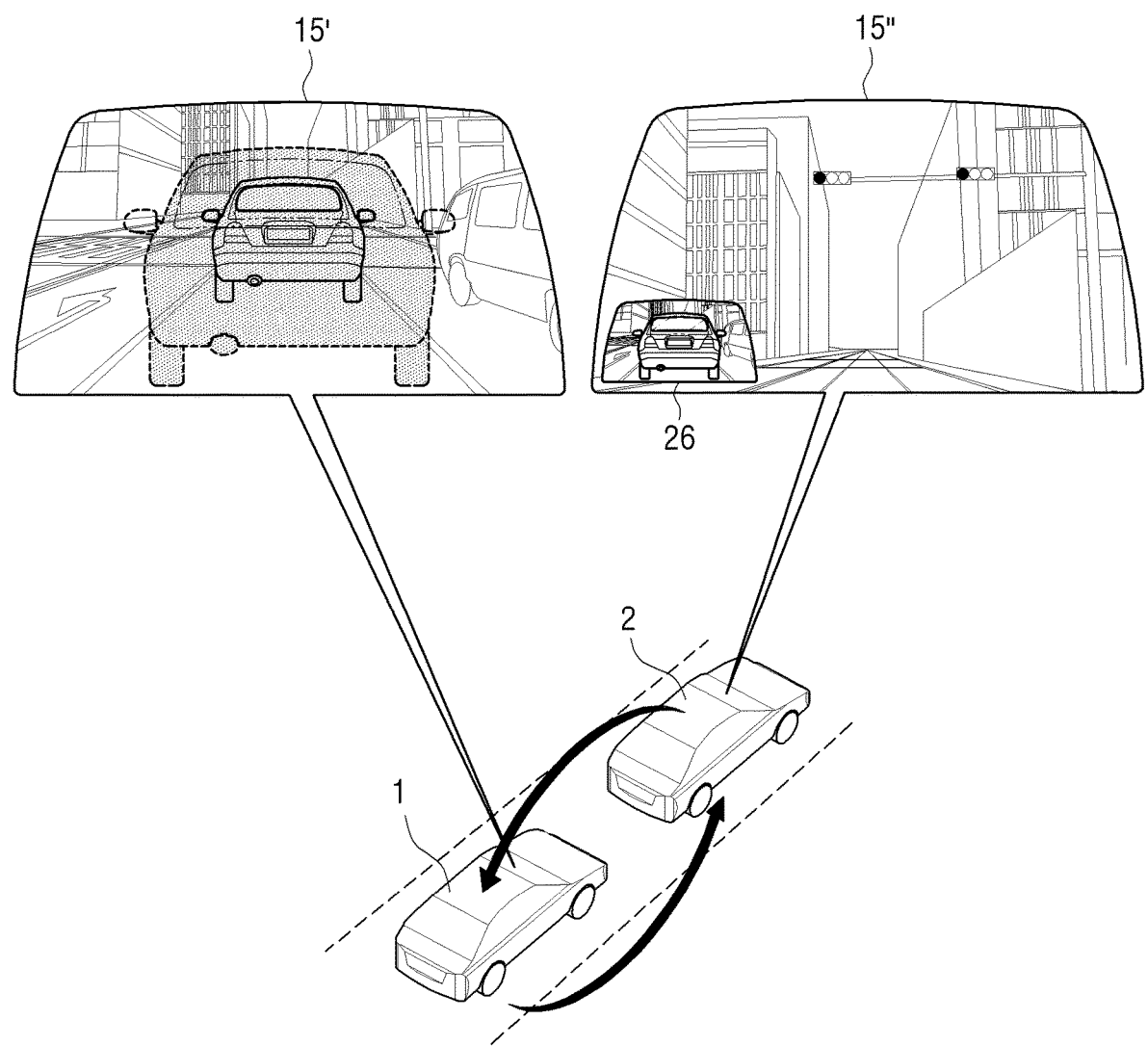

FIG. 4 is a diagram illustrating an example process in which an electronic apparatus provides a sight securing image according to another example embodiment.

The electronic apparatus 10 mounted on the vehicle 1 may determine at least one external vehicle 2 to use the external images photographed by the external vehicle, and acquire the external image photographed through the external vehicle 2. Further, the vehicle 1 may photograph the external vehicle 2 using the camera mounted on the vehicle 1 and acquire the external vehicle images including the external vehicle 2.

According to an embodiment, the electronic apparatus 10 may provide the sight securing image to the vehicle 1 using the external images and the external vehicle images, and the vehicle 1 may display the images on the transparent display 15' according to the AR method.

In this case, the electronic apparatus 10 may transmit the external vehicle image or the sight securing image photographed at the vehicle 1 back to the external vehicle 2 positioned in front of the vehicle 1.

The external vehicle 2 receiving its own image or sight securing image may display the received vehicle images or sight securing image on a part of the transparent display 15" in front. For example, the external vehicle 1 may display the external vehicle image or the sight securing image on a region 26 of one side of the transparent display 15".

Therefore, because the user of the external vehicle 2 may confirm rear posture of the vehicle 2 which is driven by himself or herself, he or she may confirm driving habits, driving states, and so on.

Figure 5A:
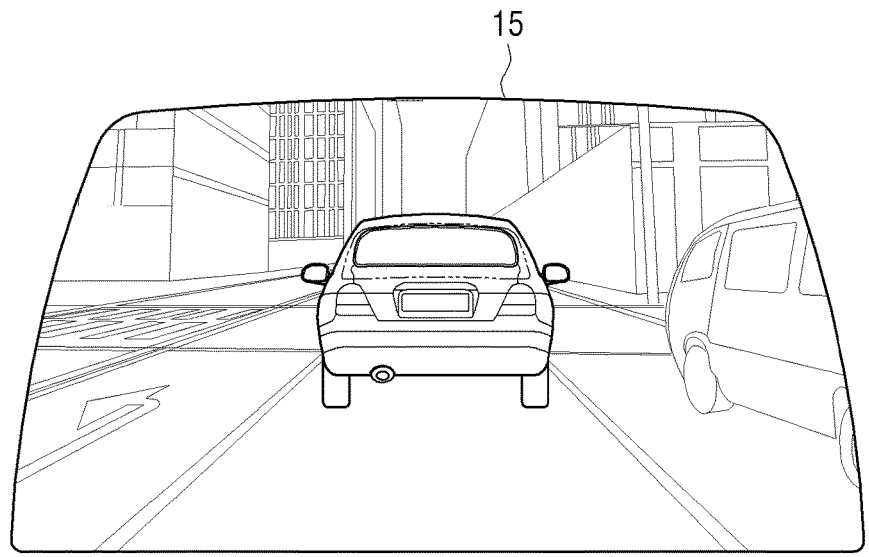
Figure 5B:
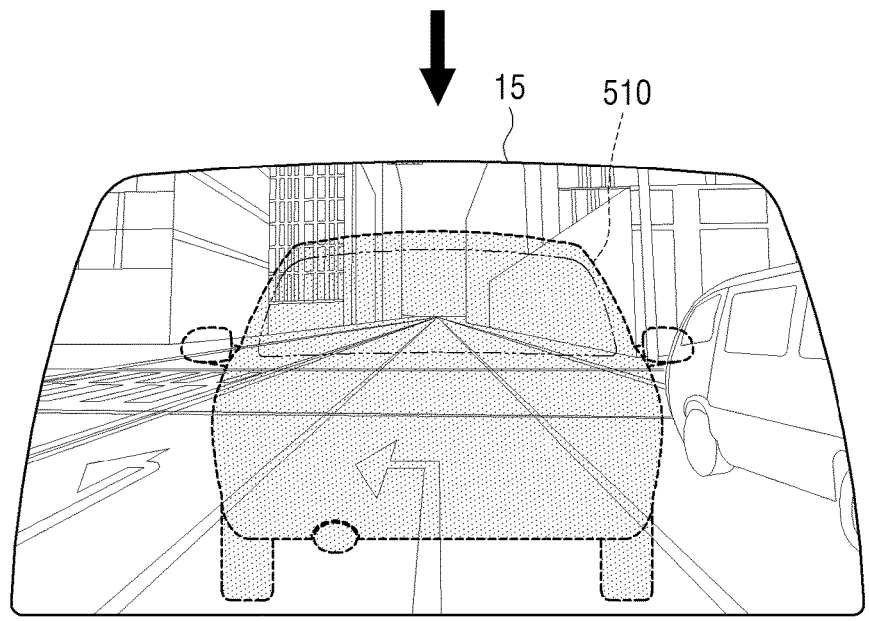

FIGS. 5A and 5B are diagrams illustrating an example process in which an electronic apparatus provides a sight securing image according to another example embodiment.

Referring to FIGS. 5A and 5B, the electronic apparatus 10 may automatically generate and provide a sight securing image according to an embodiment to the display when conditions for requesting a sight securing image are met.

For example, as shown in FIG. 5A, front environment may be provided to the user through the transparent display 15 positioned at front of the vehicle. In this case, a part of the entire region of the transparent display 15 may be obstructed by the external vehicle as distance between the user's vehicle and the external vehicle positioned in front of the vehicle becomes closer.

When a ratio of the region obstructed by the external vehicle to the entire region is equal to, or greater than a certain ratio (e.g., 1/3 to 1/2 or greater), the electronic apparatus 10 may automatically generate a triggering signal for requesting a sight securing image.

When a triggering signal is generated, the electronic apparatus 10 may determine the external vehicle hiding (obscuring) the sight as a vehicle for acquiring the external images.

The electronic apparatus 10 may acquire external images photographed by the determined external vehicle and external vehicle images in which the external vehicle is photographed.

Further, the electronic apparatus 10 may generate a sight securing image corresponding to the sight obstructed by the external vehicle by compositing at least part of the acquired external images photographed by the external vehicle and at least part of the external vehicle images.

The electronic apparatus 10 may provide the generated sight securing image to the display.

Accordingly, as shown in FIG. 5B, the sight securing image 510 may be displayed on the transparent display 15 according to the AR method. In other words, the electronic apparatus 10 may automatically generate a sight securing image and display the images on the transparent display 15 when ratio of the region obstructed by the external vehicle with respect to the entire region of the transparent display 15 is equal to, or greater than certain ratio.

FIGS. 6A, 6B, 6C and 6D are diagrams illustrating an example process of providing images for securing a sight of an electronic apparatus according to another example embodiment.

Referring to FIGS. 6A, 6B, 6C and 6D, the electronic apparatus may generate a sight securing image and provide a result to the display, when user input for requesting a sight securing image is received.

Figure 6A:
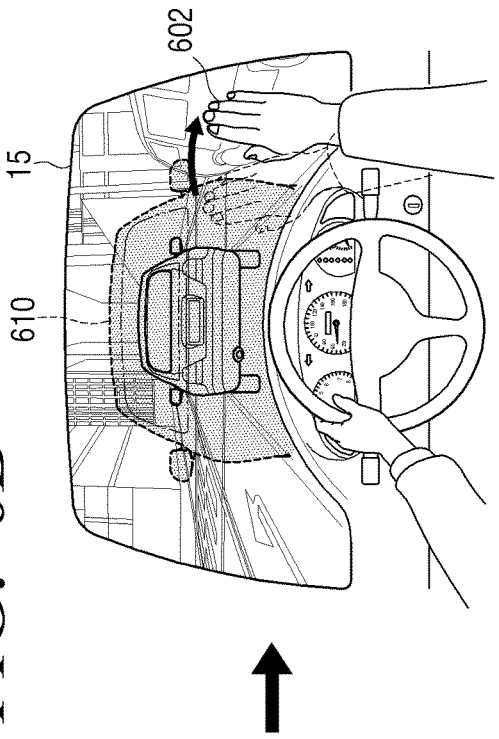

Specifically, as shown in FIG. 6A, environment in front may be provided to the user through the transparent display 15 positioned at front of the vehicle. In this case, the electronic apparatus 10 may receive user input for requesting a sight securing image. In response to the user input, the electronic apparatus 10 may generate a signal for requesting a sight securing image.

For example, the vehicle may sense the user's gesture 601 of waving his or her hand away in outer direction showing intention for a display of a sight securing image or removal of the first external vehicle in front.

The electronic apparatus 10 may generate a triggering signal for requesting the first sight securing image in response to the sensed user's gesture 601.

When a triggering signal is generated, the electronic apparatus 10 may generate the first sight securing image corresponding to the sight obstructed by the first external vehicle by compositing at least part of the external image photographed by the first external vehicle and at least part of the first external vehicle image.

Figure 6B:
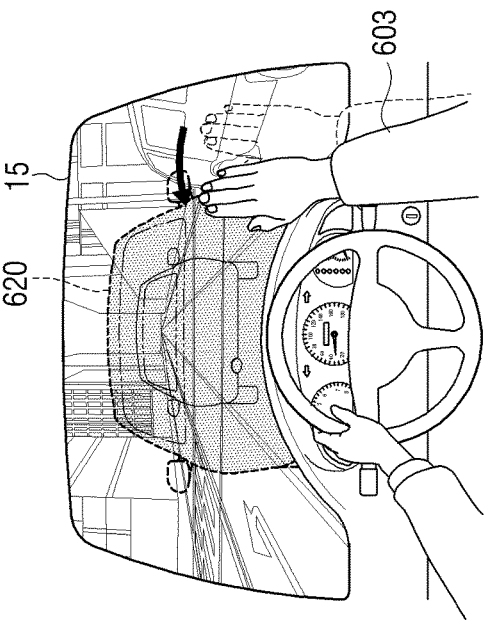

The electronic apparatus 10 may provide the generated first sight securing image to the display. Accordingly, as shown in FIG. 6B, the sight securing image 610 may be displayed on the transparent display 15 according to the AR method. Meanwhile, when another second external vehicle is present in front of the first external vehicle, it may be difficult to secure a complete sight of the user when the second external vehicle is included in a part of the sight secure image.

In this case, the vehicle may sense one more time the user's gesture 602 of waving his or her hand away in outer direction showing intention for the removal of the second external vehicle in front.

The electronic apparatus 10 may generate a triggering signal for requesting the second sight securing image in response to the sensed user's gesture 602.

When a triggering signal is generated, the electronic apparatus 10 may acquire the second external image photographed by the second external vehicle. Further, the electronic apparatus 10 may generate the second sight securing image corresponding to the sight obstructed by the second external vehicle by compositing at least part of the first sight securing image and at least part of the acquired second external image.

Figure 6D:
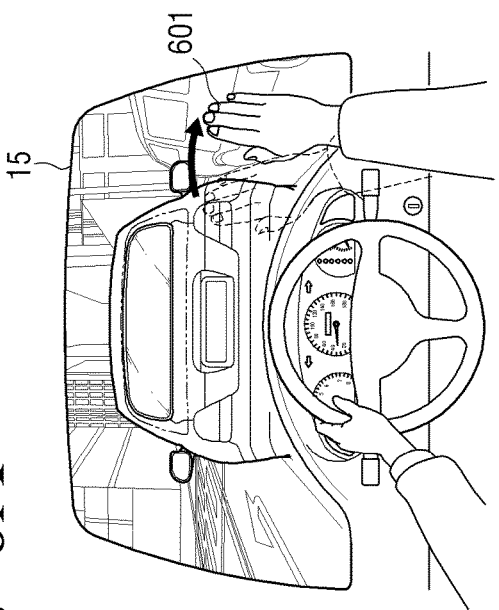
Figure 6C:
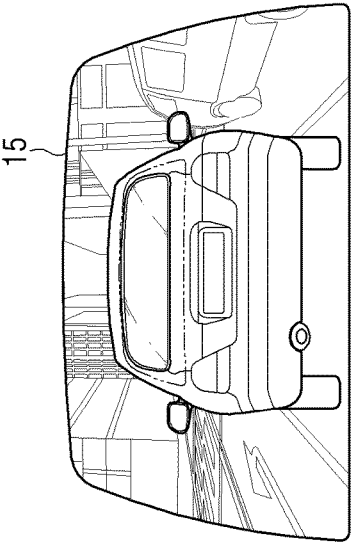

The electronic apparatus 10 may provide the generated second sight securing image to the display. Accordingly, as shown in FIG. 6C, the second sight securing image 620 may be displayed on the transparent display 15 according to the AR method.

Therefore, as the first sight securing image 610 and the second sight securing image 620 corresponding to the sight obstructed by the first external vehicle and the second external vehicle are sequentially displayed according to the user's gesture, the sight securing image optimized for preference of the user may be provided.

Meanwhile, after securing the sight, the user may want to remove the second sight securing image 620 which is being displayed, and request the sight of environment in front through a previous transparent display.

Accordingly, the vehicle may sense user's gesture 603 of waving his or her hand in an inward direction showing intention of removing the second sight securing image 620 at front.

According to the sensed user's gesture 603, the electronic apparatus 10 may remove the second sight securing image 620 displayed on the transparent display 15. Accordingly, as shown in FIG. 6D, screen in front may be provided back on the transparent display 15 as shown in the first process.

According to another embodiment, in response to the sensed user's gesture 603, the electronic apparatus 10 may remove the second sight securing image 620 displayed on the display and provide the first sight securing image 610 back on the transparent display.

According to various embodiments, in order to display or remove the sight securing image on the display, the user may perform various user input in addition to gesture. For example, according to an embodiment, when the user utters "secure sight," the electronic apparatus 10 may display the generated sight securing image on the display in response to the recognized user voice.

For another example, when the user selects or manipulates user interface (e.g., button, touch UI, or the like) corresponding to a display function of the sight securing image provided on a steering device or a dashboard of the vehicle, the electronic apparatus 10 may display the generated sight securing image according to an embodiment on the display in response to the user's selecting.

According to various embodiments, as a gesture associated with a sight securing image, the user may perform a gesture of pointing toward far direction (e.g., stretching out the elbow and pointing toward the far direction or upper direction) or gesture of pointing toward nearby direction (e.g., bending the elbow and pointing toward a near direction or lower direction).

In this case, in response to the gesture of indicating far direction, the electronic apparatus 10 may display the second sight securing image 620 on the transparent display according to the AR method. Further, according to the gesture of indicating near direction, the electronic apparatus 10 may display the first sight securing image 610 on the transparent display according to the AR method.

Figures 7A, 7B:
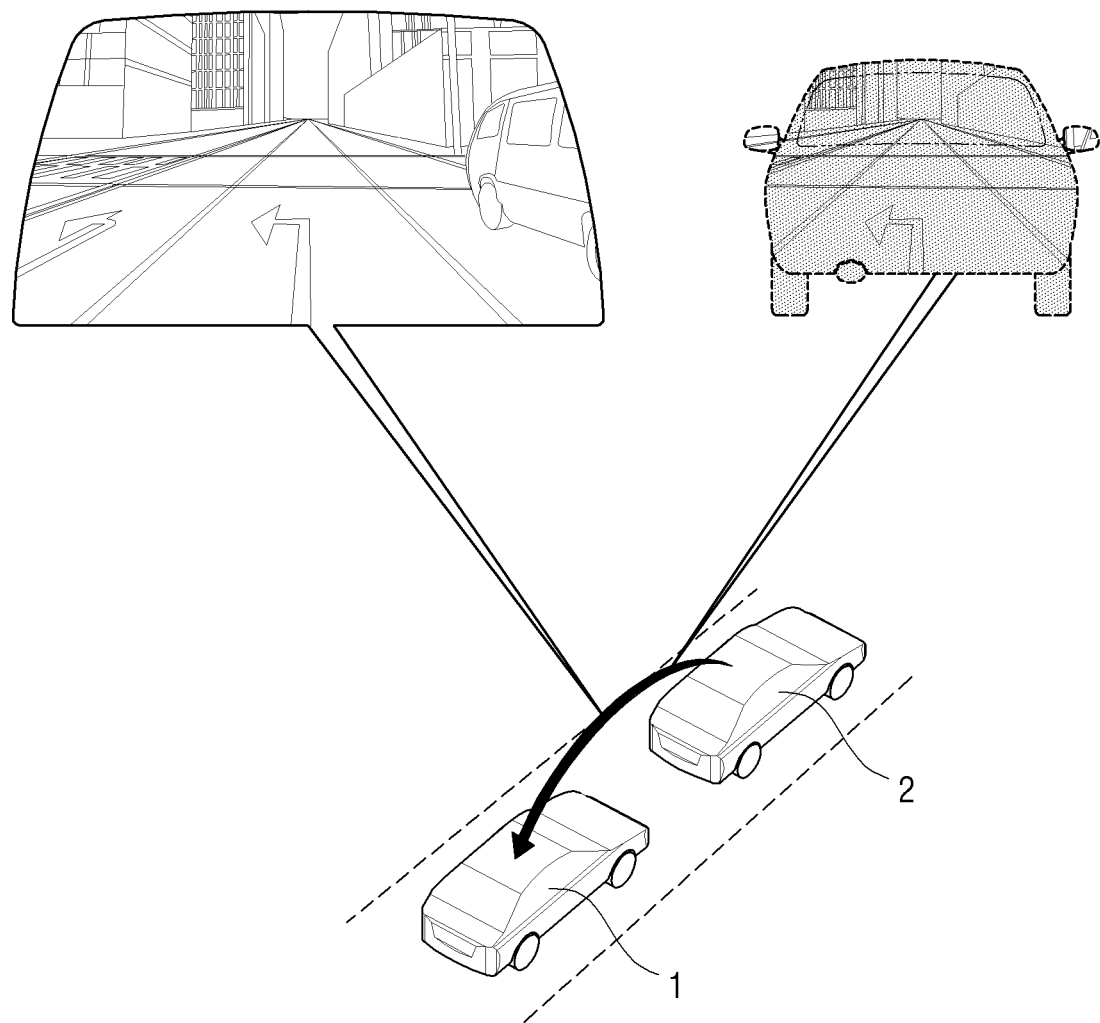
FIGS. 7A and 7B are diagrams illustrating examples of external images photographed by an external vehicle according to an example embodiment.

FIGS. 7A and 7B are diagrams illustrating examples of external images photographed with an external vehicle according to an example embodiment.

The external image photographed using the camera mounted on the external vehicle 2 may be stored in the external vehicle 2 or the externally-located server.

When the electronic apparatus 10 mounted on the vehicle 1 requests external images for generation of sight securing image, the external vehicle 2 or the external server may transmit the external images photographed through the external vehicle 2 determined by the electronic apparatus 10 to the electronic apparatus 10.

In this case, the external vehicle 2 or the external server transmitting external images may transmit the entire images photographed through the external vehicle 2 as shown in FIG. 7A.

Alternatively, the external vehicle 2 or the external server may selectively and only transmit images corresponding to the sight obstructed to the user of the vehicle 1 positioned behind, which is necessary for generation of sight securing image, as shown in FIG. 7B. In this case, the electronic apparatus 10 may transmit range information of the range corresponding to the sight obstructed to the user boarding the vehicle positioned behind the external vehicle 2 or the external server. In response to the transmitted range information, the external vehicle 2 or the external server may transmit only the images corresponding to the sight obstructed to the user boarding the vehicle 1 positioned behind.

As shown in FIG. 7B, when only the images corresponding to the obstructed sight are transmitted, an amount of data transmitted by the external vehicle 2 or the external server may be greatly reduced, and transmission efficiency between the external vehicle 2 and the electronic apparatus 10 may increase.

Figure 8:
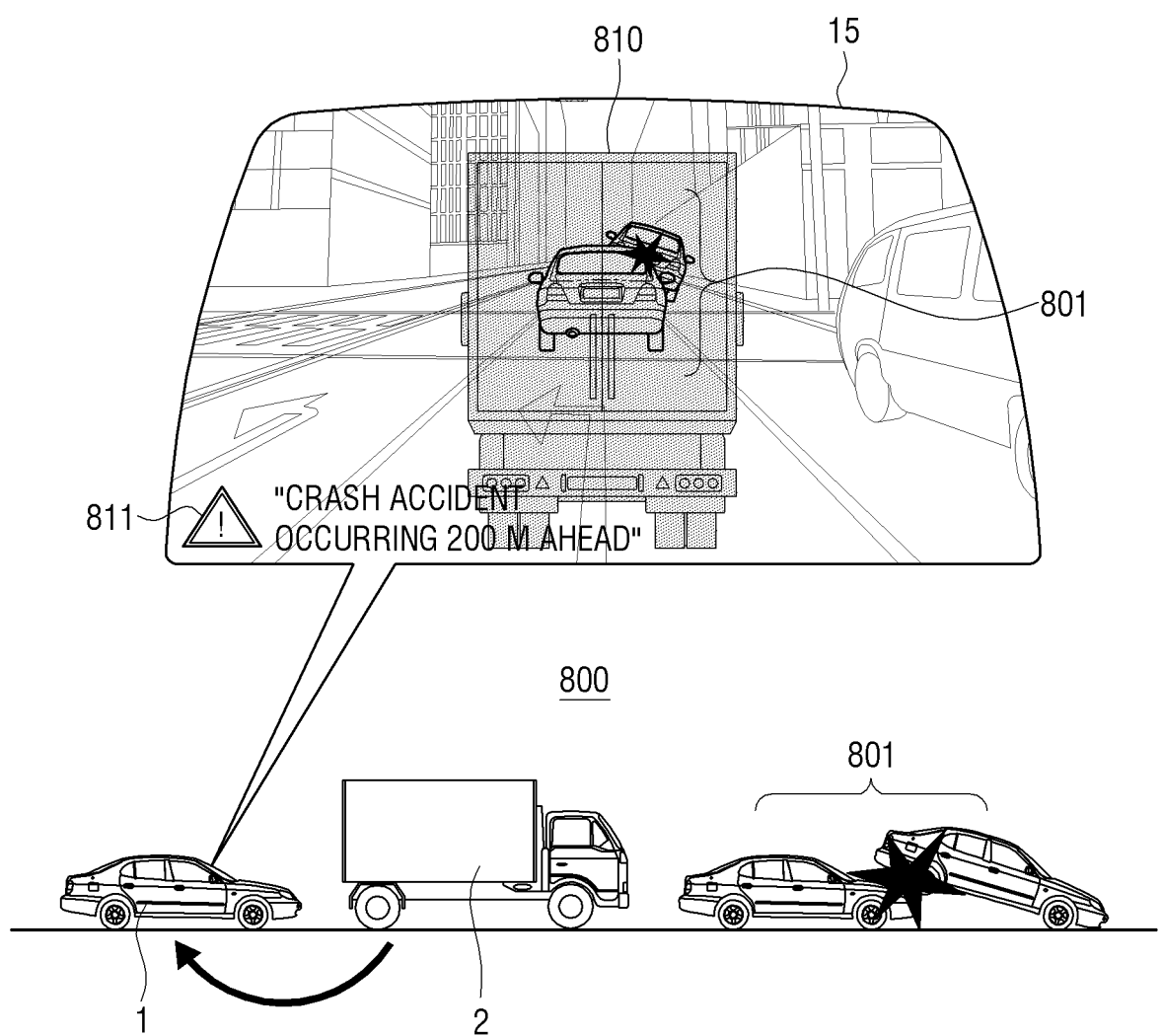
FIGS. 8 and 9 are diagrams illustrating an example process in which a sight securing image is provided according to another example embodiment.

FIG. 8 is a diagram illustrating an example process of providing a sight securing image according to another example embodiment.

Under the traffic condition 800 as shown in FIG. 8, the external vehicle 2 positioned in front of the user's vehicle 1 may sense emergency situation 801. The emergency situation 801 may be, for example, situation in which the external vehicle 2 suddenly stops or decelerates as emergency situation occurs in front such as car accident, road blocking, pedestrian appearing, or the like.

When the emergency situation 801 is sensed, the external vehicle 2 may immediately broadcast the photographed external images including the emergency situation 801 through the camera of the external vehicle 2 to neighboring vehicles. In this case, the neighboring vehicles may include the user's vehicle 1 positioned behind.

The electronic apparatus 10 mounted on the user's vehicle 1 may generate and provide a sight securing image to the display according to an embodiment, using the received external images.

Accordingly, as shown in FIG. 8, the sight securing image 801 including the emergency situation 801 may be displayed on the transparent display 15 according to the AR method.

In this case, the transparent display 15 may additionally display notice information 811 indicating that emergency is currently occurring.

The notice information 811 may acquire information of the emergency situation acquired from the V2X server, and provide the additional notice information of the emergency situation. For example, the notice information may include emergency situation occurring spot, emergency situation occurring traffic lane, emergency situation occurring time, emergency situation report, detour road information, or the like. In FIG. 8, the notice information 811 may include accident information indicating, "Crash accident 200 m ahead," for example.

When emergency situation occurs, the vehicle 1 driving behind generally has a difficulty of checking the emergency situation due to the external vehicle 2 positioned in front. However, according to an embodiment, the vehicle 1 positioned behind may swiftly check the emergency situation and the user of the vehicle 1 may perform immediate response to the emergency situation. For example, the user may search detour roads or change traffic lanes in advance to avoid the spot where emergency situation occurs.

According to various example embodiments, the image including the emergency situation photographed at one vehicle may be transmitted to another vehicle positioned behind, and another vehicle positioned behind may sequentially transmit the images including the emergency situation to yet another vehicle positioned behind. Accordingly, even when a plurality of vehicles are present in front, the user of the vehicle may sense the emergency situation occurring at remote distance and may proactively act for the emergency situation.

Figure 9:
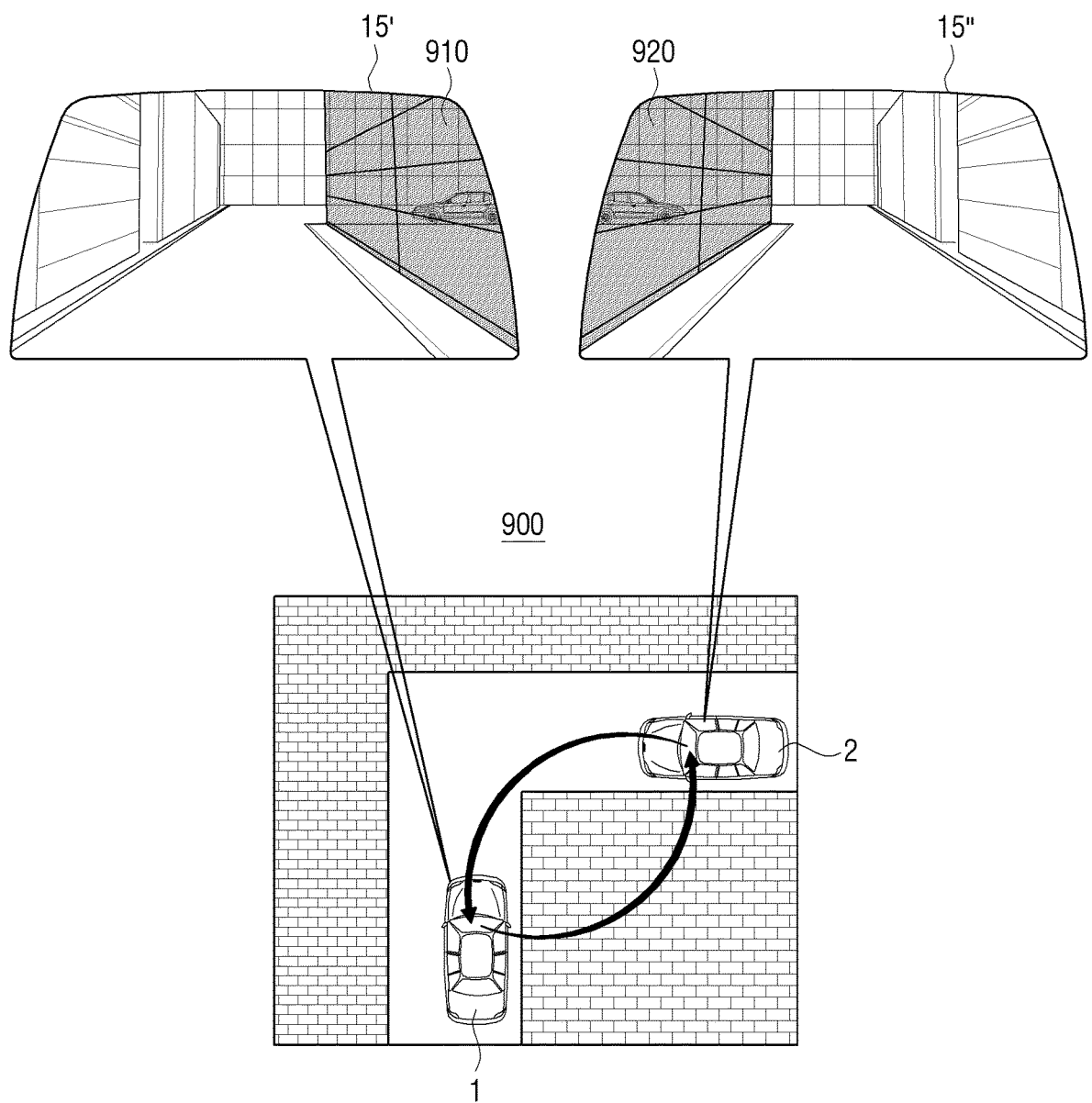

FIG. 9 is a diagram illustrating an example process of providing a sight securing image according to another example embodiment.

In the traffic situation 900 of FIG. 9, the first vehicle 1 and the second vehicle 2 may be driving toward each other around the corner of the road.

In this case, the first vehicle 1 may provide the external images photographed by itself to the second vehicle 2 and the second vehicle 2 may provide the external images photographed by itself to the first vehicle 1.

The first electronic apparatus 10 of the first vehicle 1 and the second electronic apparatus 10 of the second vehicle 2, which receive the external images from the counterpart vehicle, may respectively generate a sight securing image according to an embodiment using the received external images from the counterpart vehicle. Further, the first electronic apparatus 10 of the first vehicle 1 and the second electronic apparatus 10 of the second vehicle 2 may respectively provide the generated sight securing image to the display.

Accordingly, as shown in FIG. 9, the transparent display 15' of the first vehicle 1 may display the sight securing image 910 according to the AR method, in which the corner region is shown transparently or semi-transparently so that the second vehicle 2 is prominently shown.

Further, as shown in FIG. 9, the transparent display 15" of the second vehicle 2 may display the sight securing image 920 according to the AR method, in which the corner region is shown transparently or semi-transparently so that the first vehicle 1 is prominently shown.

Accordingly, the user of the first vehicle 1 and the user of the second vehicle 2 are enabled to perform safe driving because the counterpart vehicle obstructed by the corner region (e.g., buildings, street tress, or the like) is confirmed.

Figure 10B:
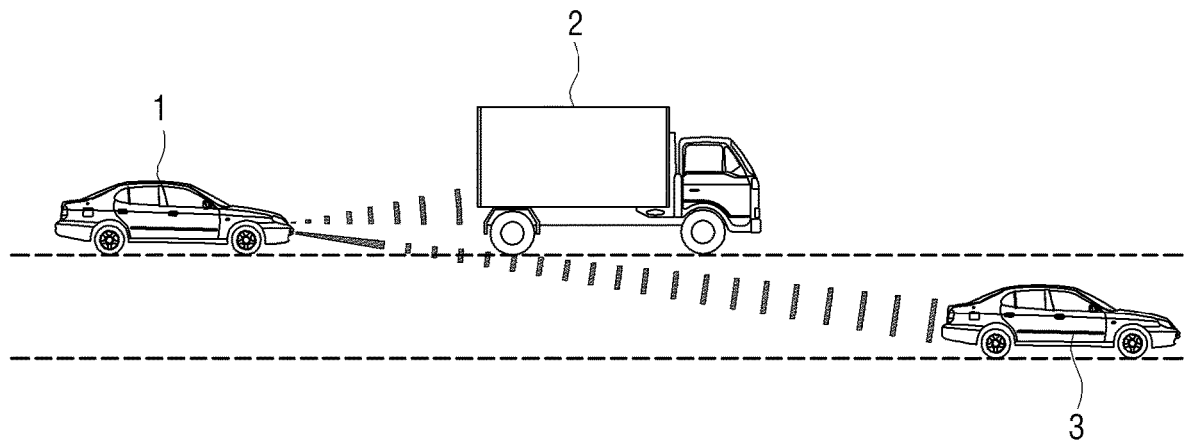
Figure 10C:
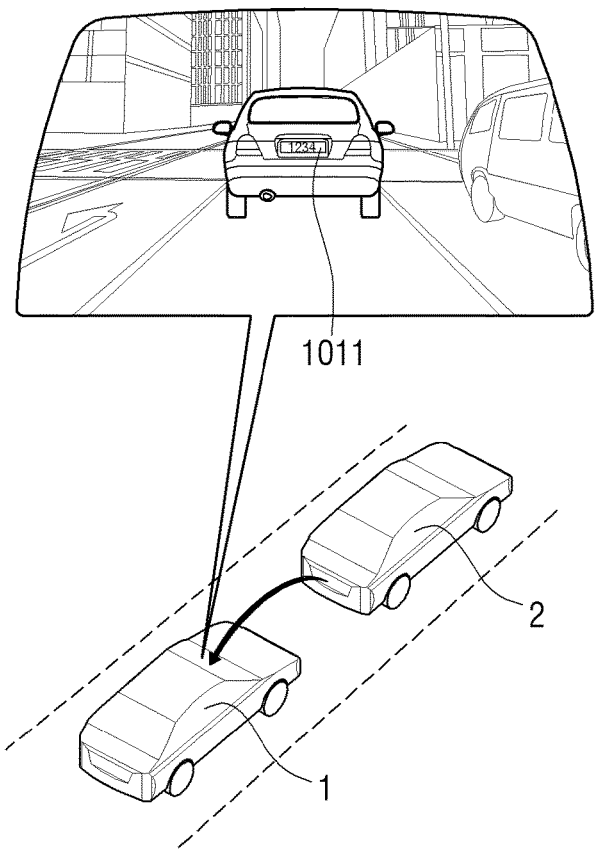

FIGS. 10A, 10B and 10C are diagrams illustrating an example method of the electronic apparatus for determining an external vehicle according to an example embodiment.

For example, as shown in FIG. 10A, the electronic apparatus may acquire vehicle information of the external vehicles 2, 3, 4 positioned nearby the vehicle 1 mounted with the electronic apparatus 10 from the V2X server using the V2X communication method. In this case, the external vehicles 2, 3, 4 positioned nearby the vehicle 1 mounted with the electronic apparatus 10 may be, for example, the external vehicles 2, 3, 4 present within a range where the near field communication with the vehicle 1 is available.

Each vehicle information of the external vehicles may include driving information of each of the vehicles as shown by 1001, 1002, 1003 of FIG. 10A, for example. The driving information may include, for example, at least one of: position of vehicles; moving direction; information of traffic lanes in which vehicles are driving; state information of vehicle maneuvering; information of driving or parking of vehicles; and driving speed of vehicles.

The V2X server may transmit a vehicle list 1005 having vehicle information of the external vehicles 2, 3, 4 to the vehicle 1 mounted with the electronic apparatus 10.

The electronic apparatus 10 may determine an external vehicle to acquire external images based on each driving information of the vehicles included in the vehicle list.

For example, the electronic apparatus 10 may determine a vehicle, which is positioned in the same traffic lane, has the same advancing direction as the vehicle of the user and is at a nearest distance, to be the vehicle to acquire external images.

In this case, the electronic apparatus 10 may determine a plurality of vehicles to acquire external images. For example, the electronic apparatus 10 may determine a plurality of vehicles, which are positioned in the same traffic lane as the user's vehicle present in a range in which communication with the vehicle is available and have the same advancing direction, to be the vehicles to acquire external images.

According to another embodiment, as shown in FIG. 10B, the electronic apparatus 10 mounted on the vehicle 1 may determine the external vehicle to acquire external images based on a distance sensor (e.g., infrared sensor, LED sensor or the like). For example, the electronic apparatus 10 may directly sense distance to the external vehicles 2, 3 positioned nearby the vehicle 1 using the distance sensor. Next, the electronic apparatus 10 may determine the external vehicle 2 having the nearest sensed distance among the vehicles 2, 3 to be the external vehicle to acquire external images.

According to another embodiment, as shown in FIG. 10C, the electronic apparatus 10 may determine a vehicle to acquire external images based on the information 1011 (e.g., identification information of an external vehicle) included in the images photographed by the camera of the vehicle 1.

For example, a forward-facing camera of the vehicle 1 mounted with the electronic apparatus 10 may photograph the external vehicle 2 positioned in front of the vehicle 1. When identification information (e.g., car license number plate, car type, or the like) of the external vehicle is acquired from the photographed images, the electronic apparatus 10 may determine the external vehicle 2 corresponding to the identification information 1011 to be the vehicle to acquire image information. In this case, the electronic apparatus 10 may recognize numbers, characters on the license number plate or car type from the photographed images using the image processing technology.

The electronic apparatus 10 may request external images to the external vehicle 2 corresponding to the identification information 1011, and acquire the external images from the external vehicle 2. The electronic apparatus 10 may request the external images photographed at the external vehicle 2 corresponding to the identification information 1011 to the external server, and acquire the external images from the external server.

Figure 11A:
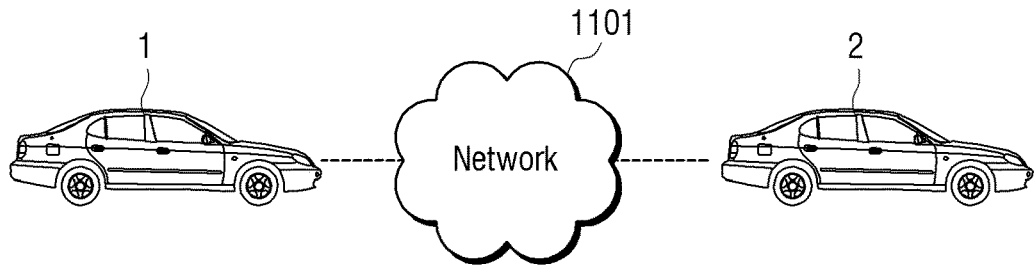
FIGS. 11A, 11B and 11C are diagrams illustrating an example method of a vehicle mounted with an electronic apparatus for communicating with an external vehicle according to an example embodiment.
Figure 11B:
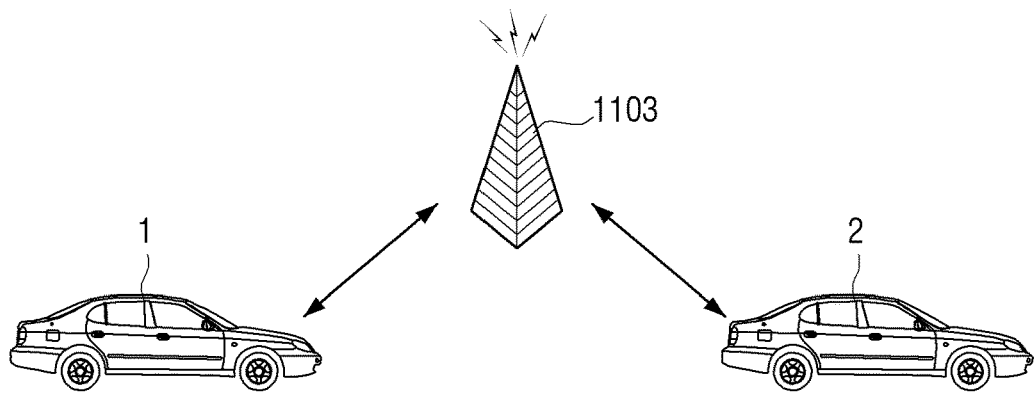
Figure 11C:
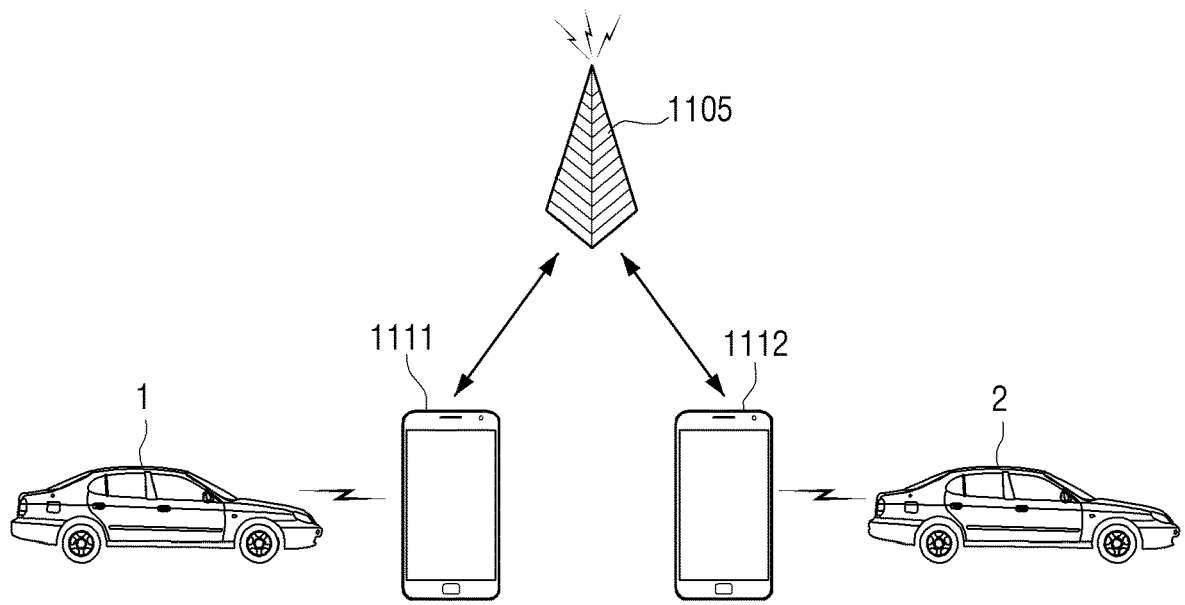

FIGS. 11A, 11B and 11C are diagrams illustrating an example method of a vehicle mounted with an electronic apparatus for communicating with an external vehicle according to an example embodiment.

In FIGS. 11A, 11B and 11C, the vehicle 1 of the user may determine the vehicle 2 to acquire external images and perform communication with the determined external vehicle 2.

For example, as shown in FIG. 11A, the V2V communication of vehicles through a network 1101 may be available between the user's vehicle 1 and the external vehicle 2. The communication between vehicles (e.g., IEEE 802.11p WAVE) provides high mobility and has features suitable for outdoor environment where interference such as Doppler Shift or the like easily occurs. Since the communication between vehicles is communication of the vehicles moving at high speed in outdoor environment, frequency selective fading may frequently occur.

Alternatively, the user's vehicle 1 may perform the near field communication with the external vehicle 2. Examples of the near field communication may include Wi-Fi, Bluetooth, ultra wideband (UWB), ZigBee, near field communication (NFC), Wi-Fi direct (WFD), infrared data association (IrDA), and so on.

Alternatively, the user's vehicle 1 may perform communication with the external vehicle 2 according to an ad-hoc method. The ad-hoc method indicates that terminals exchange data in peer-to-peer form without access point (AP, e.g., wireless router). The user's vehicle 1 may be grouped with a plurality of external vehicles through ad-hoc or the like. The grouped vehicles may share multimedia contents with each other or information provided from navigation. The information provided from the navigation may be the information about shortest moving path, current moving position, map information, and so on.

For another example, as illustrated in FIG. 11B, the user's vehicle 1 may communicate with the external vehicle 2 through the base station 1103. For example, when the external images photographed at the external vehicle 2 are transmitted to the base station 1103, the base station 1103 may transmit the external images received from the external vehicle 2 to the user's vehicle 1. Conversely, the base station 1103 may transmit an external image requesting signal of the user's vehicle 1 to the external vehicle 2.

For another example, as illustrated in FIG. 11C, a mobile terminal 1111 in the user's vehicle 1 and a mobile terminal 1112 in the external vehicle 2 may perform communication with each other according to the mobile communication network or the wireless LAN (Wi-Fi) through the base station 1105. In this case, the external images photographed at the external vehicle 2 may be transmitted to the electronic apparatus 10 mounted on the vehicle 1 via the mobile terminal 1112 in the external vehicle 2, the base station 1105 and the mobile terminal 1111 in the user's vehicle 1. Conversely, an external image requesting signal requested by the user's vehicle 1 may be transmitted to the external vehicle 2 via the mobile terminal 111, the base station 1105 and the mobile terminal 1112.

FIGS. 12A, 12B, 12C and 12D are diagrams illustrating an example method of the electronic apparatus 10 for generating a sight securing image according to an example embodiment.

In FIGS. 12A, 12B, 12C and 12D, the image acquirer 12 of the electronic apparatus 10 may acquire the external vehicle images 1201 in which the external vehicle 2 is photographed and the external images 1203 photographed by the external vehicle 2 with the communicator of the vehicle 1 mounted with the electronic apparatus 10.

The image compositor 13 may generate a sight securing image by compositing the acquired external vehicle images and external images according to various methods of the image processing technology.

Figure 12A:
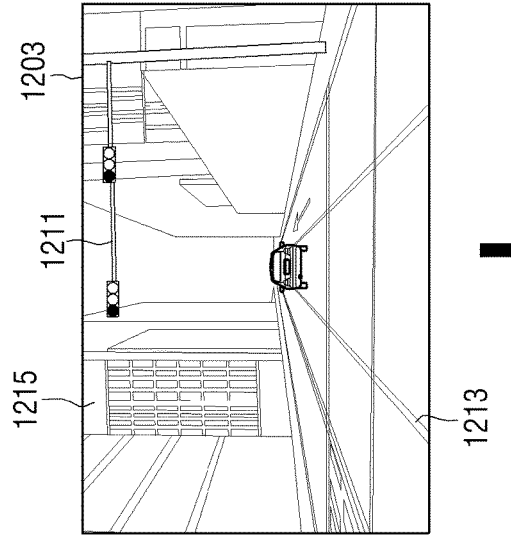
FIGS. 12A, 12B, 12C and 12D are diagrams illustrating an example method of an electronic apparatus for generating a sight securing image according to an example embodiment.
Figure 12B:
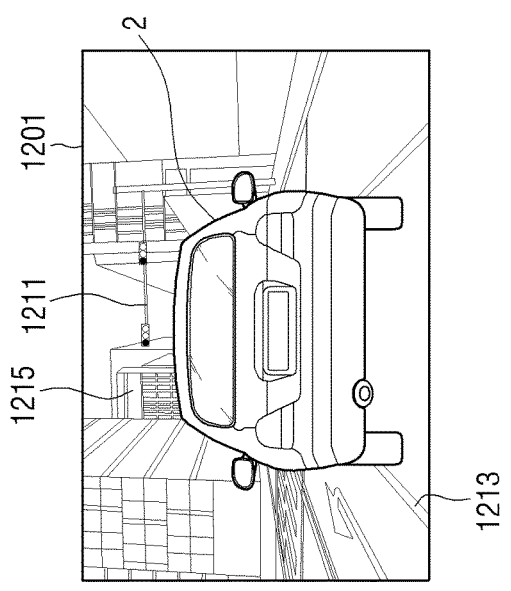

For example, FIG. 12A shows an image in which the vehicle 1 mounted with the electronic apparatus 10 photographs the external vehicle 2, and FIG. 12B shows an external image photographed with the external vehicle 2.

In this case, the image compositor 13 may composite two images based on common environment information included in both of the external vehicle images 1201 and the external images 1203. The common environment information may be, for example, feature information included in both of the external vehicle images and the external images, and may include at least one among neighboring buildings 1215, traffic lights 1211, traffic lanes 1213, and road signs standing on a roadside indicating traffic regulations and instructions. Alternatively, the image compositor 13 may composite two images based on road curve information (e.g., straight road, road curve angle) or road slant information included in the external vehicle images 1201 and the external images 1203.

Figure 12C:
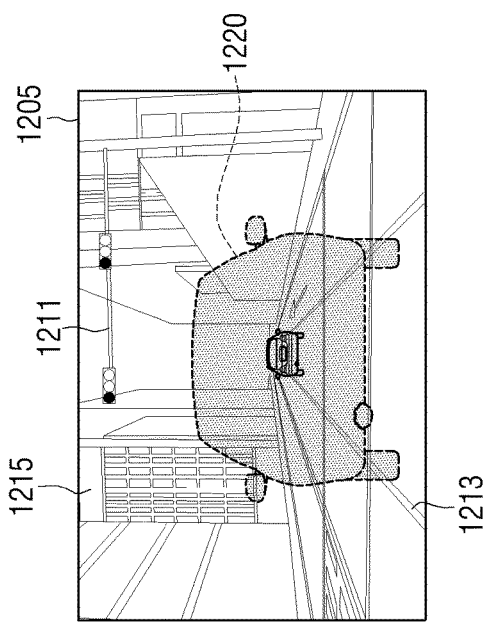

As a result of compositing, as shown in FIG. 12C, the image compositor 13 may generate composited images 1205 including the sight securing image 1220 by rotating, magnifying and reducing at least one of the two images based on the common environment information 1211, 1213, 1215 and overlaying the two images with each other.

In this case, the image compositor 13 may composite images by overlaying, while processing the two images with different transparencies. For example, the image compositor 13 may composite images by processing the two images so that an image of the external vehicle has higher transparency than the external image, and overlaying the images.

The image compositor 13 may provide the entire composited image or a part of the overlain images to the transparent display 15 as the sight securing image. When a part of the overlain images is provided to the display 15, the image compositor 13 may generate a sight securing image by extracting a region corresponding to the sight obstructed by the external vehicle from the overlain images, e.g., a region corresponding to the external vehicle, and provide the generated sight securing image to the transparent display 15.

Figure 12D:
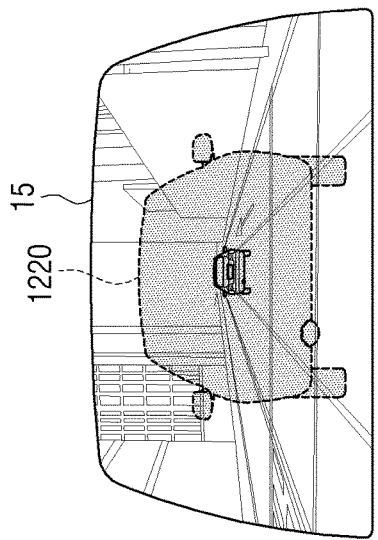

Accordingly, as shown in FIG. 12D, the transparent display 15 of the vehicle 1 may display the sight securing image 1220 according to the AR method.

Figure 13A:
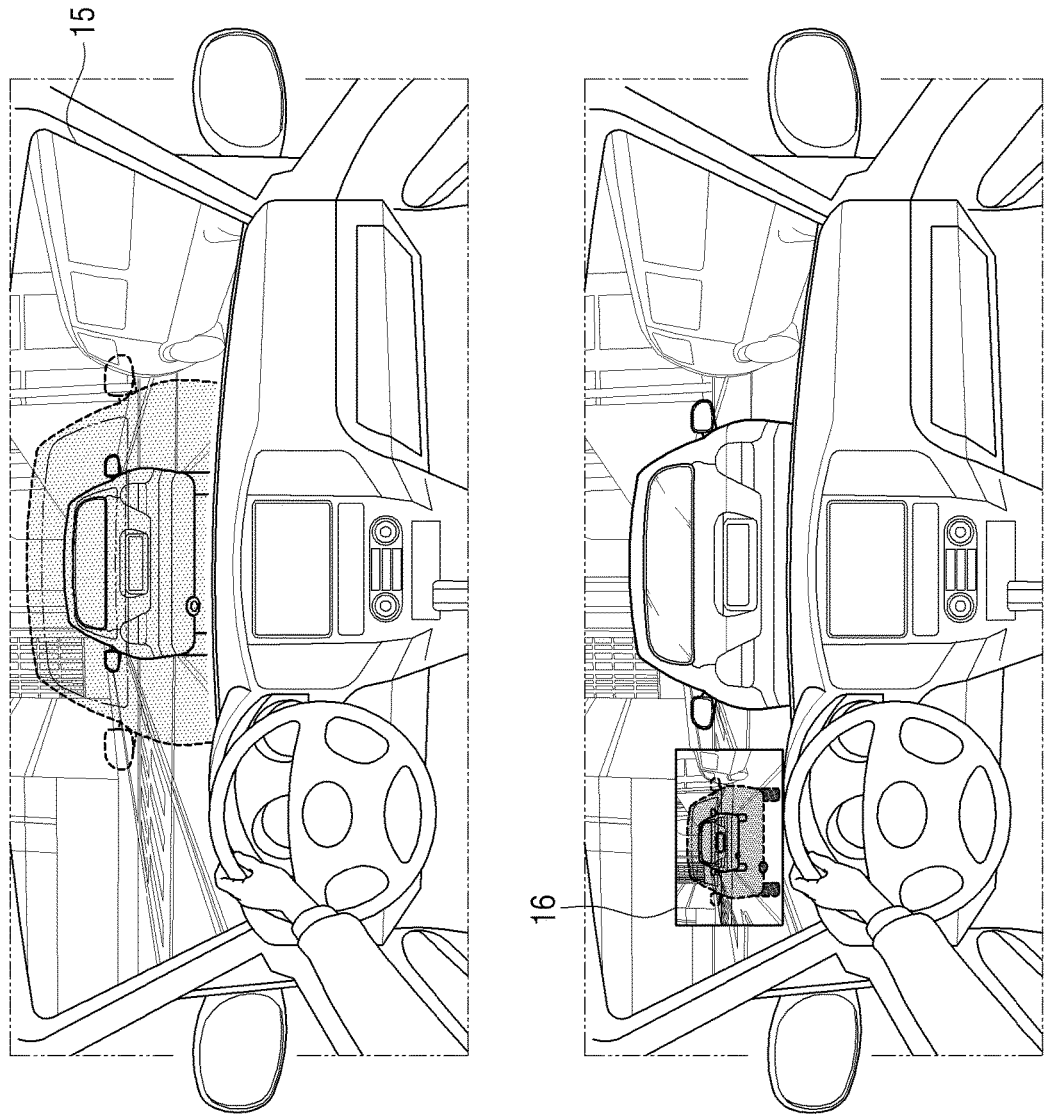
FIGS. 13A, 13B and 13C are diagrams illustrating example displays which display a sight securing image according to various example embodiments.
Figure 13B:
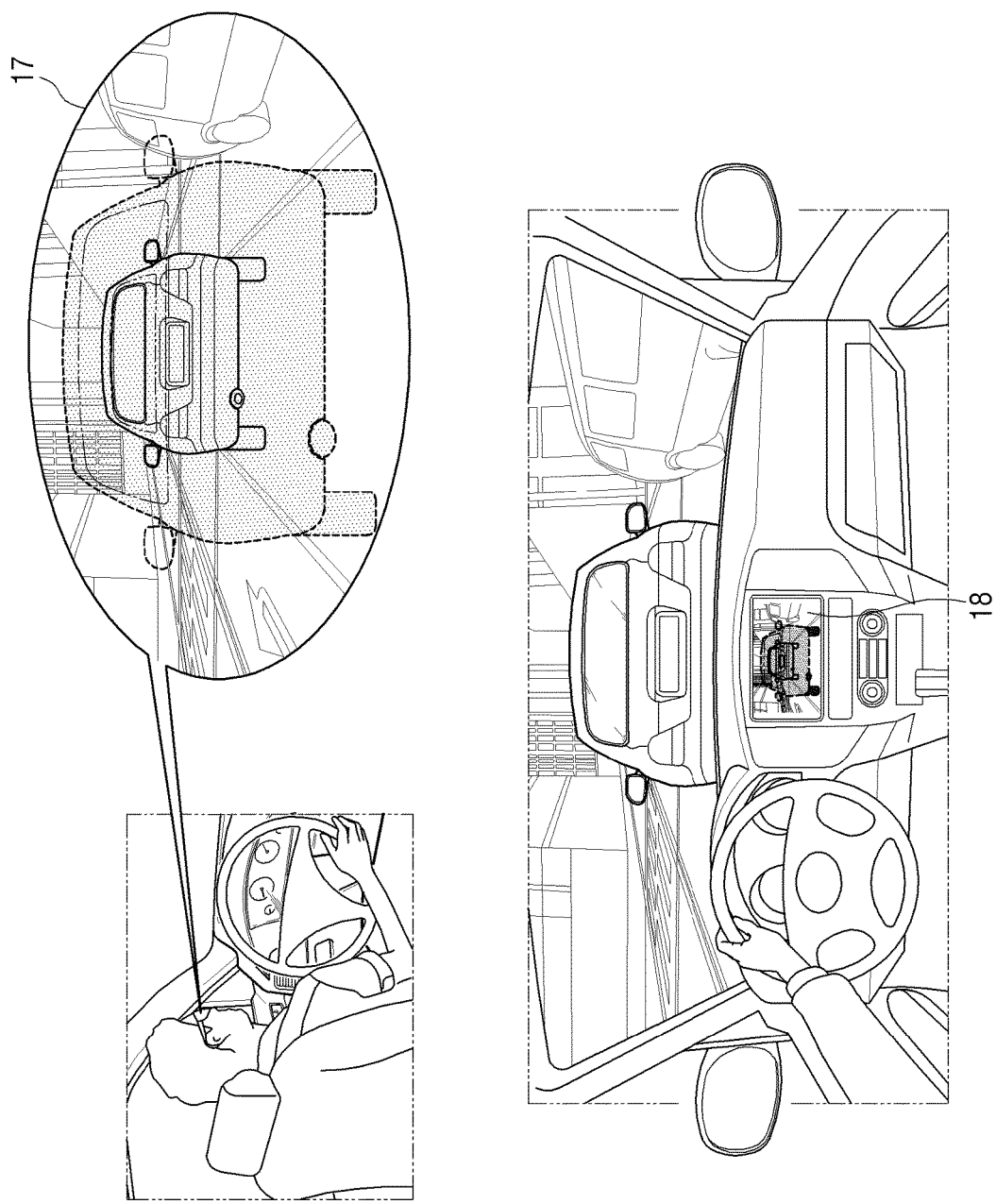
Figure 13C:
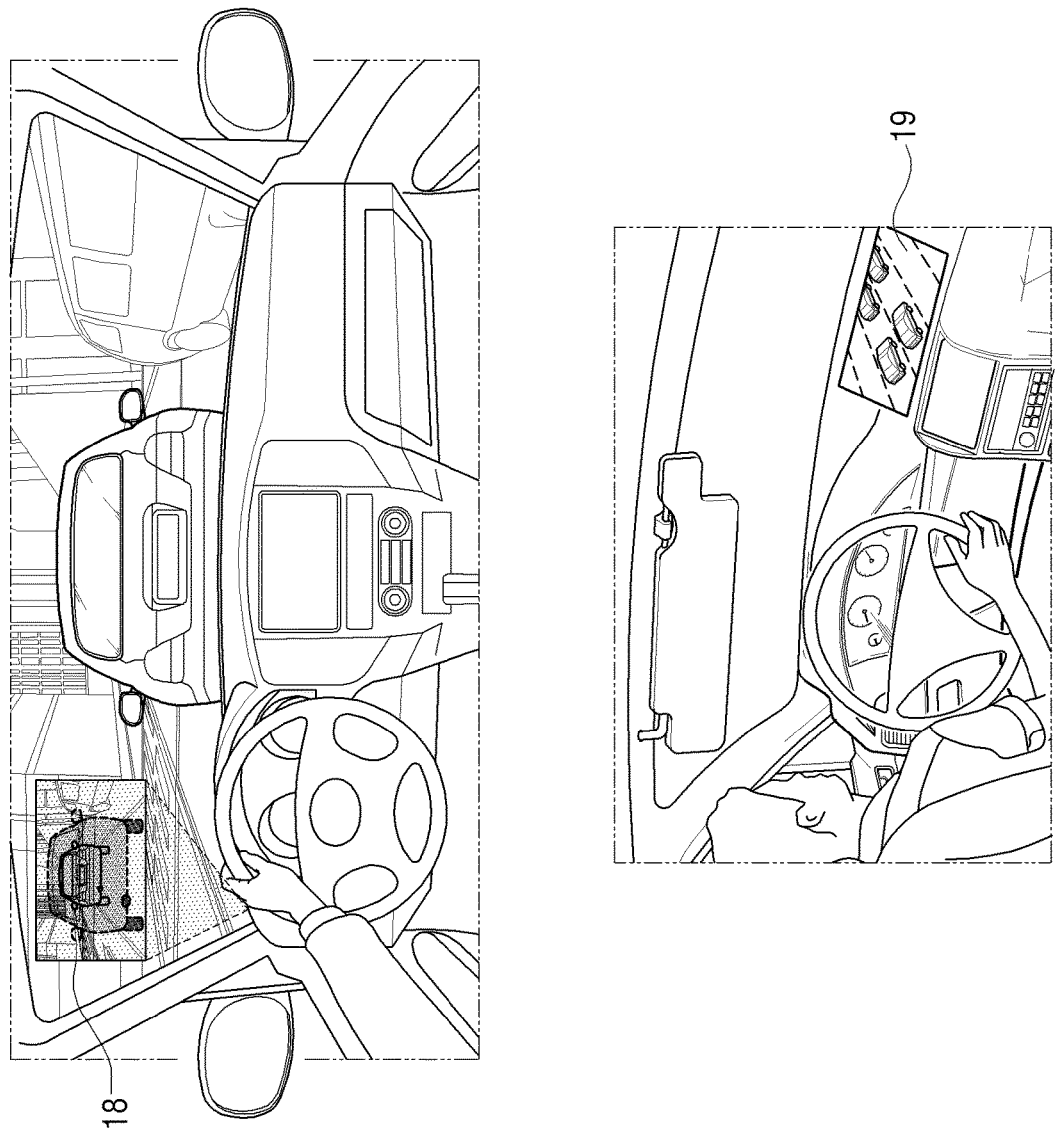

FIGS. 13A, 13B and 13C are diagrams illustrating example displays displaying a sight securing image according to various example embodiments.

When the sight securing image is provided from the image provider 14, the display of the electronic apparatus 10 may display the provided sight securing image.

For example, as shown in FIG. 13A, the display may be the entire transparent display 15 positioned at the front of the vehicle. In this case, the sight securing image may be displayed on the entire (or part of) transparent display 15 according to the AR method.

The sight securing image displayed on the transparent display 15 may be displayed with highlighting. For example, the sight securing image may be displayed with flickering for a certain time or displayed with different transparency, brightness or color. In this case, transparency, brightness or color may be varied according to interior or exterior illuminance of the vehicle.

According to various embodiments, the external vehicle displayed according to the AR method may be displayed with an outlining only, or may flicker with certain periodicity.

For another example, as shown in FIG. 13A, the sight securing image may be displayed on a head up display 16 of the vehicle.

For another example, as shown in FIG. 13B, the sight securing image may be displayed on the display 17 of a wearable device worn by the user.

For another example, as shown in FIG. 13B, the sight securing image may be displayed on the display 18 positioned on the dashboard of the user's vehicle.

For another example, as shown in FIG. 13C, the sight securing image may be projected as a projector image 18 on the transparent display positioned at the front according to the projector displaying method.

For another example, as shown in FIG. 13C, the sight securing image may be displayed in a space as a 3-dimensional (3D) images 19 according to the 3D object displaying method.

Figure 14:
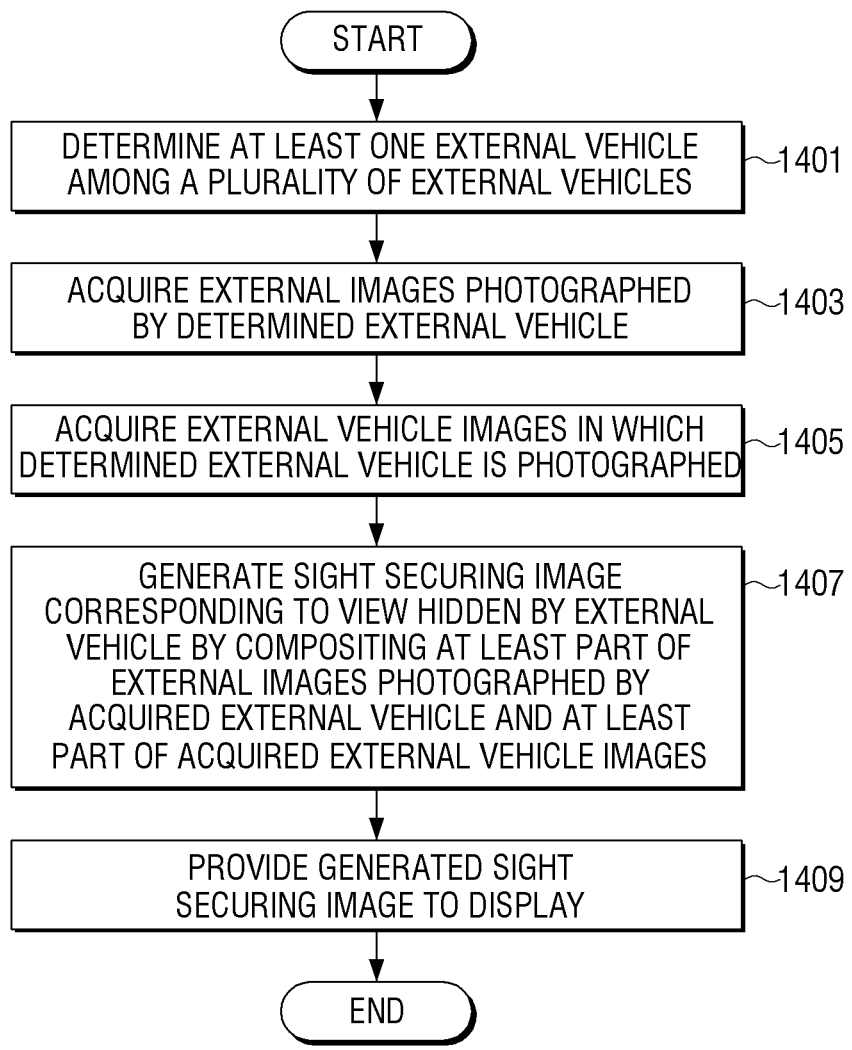
FIG. 14 is a flowchart illustrating an example method in which an electronic apparatus provides a sight securing image according to an example embodiment.

FIG. 14 is a flowchart illustrating an example method of an electronic apparatus 10 providing a sight securing image according to an example embodiment.

The electronic apparatus 10 may determine at least one external vehicle among a plurality of external vehicles, at 51401. For example, the electronic apparatus 10 may determine at least one external vehicle to acquire external images based on at least one of: driving information of each of a plurality of external vehicles; distance information of each of a plurality of external vehicles measured with the distance sensor; and identification information of each of a plurality of external vehicles.

Meanwhile, the electronic apparatus 10 may determine at least one of the external vehicles when a signal for requesting the sight securing image is received. In this case, a signal for requesting the sight securing image may be a signal generated when a region of the display obstructed by the external vehicle is equal to, or greater than a certain ratio of the entire region of the display, or may be a signal generated when user input intended to display the sight securing image is received.

The electronic apparatus 10 may acquire the external images photographed by the determined external vehicle, at 51403. For example, the electronic apparatus 10 may acquire the external images photographed by the external vehicle from the external vehicle or the externally-located server.

Meanwhile, in order to acquire the external images, the electronic apparatus 10 may provide range information of a range corresponding to the sight obstructed by the external vehicle to the external vehicle or the externally-located server.

Further, the electronic apparatus 10 may acquire the external vehicle images in which the determined external vehicle is photographed, at 51405. In this case, the operation at 51405 may be performed previously to the operation at 51403.

The electronic apparatus 10 may composite at least part of the external images photographed by the external vehicle and at least part of the external vehicle images, to generate a sight securing image corresponding to the sight obstructed (hidden) by the external vehicle, at 51407.

For example, the electronic apparatus 10 may generate a sight securing image by overlaying at least part of the external vehicle images and at least part of the external images based on the common environment information included in both of the external vehicle images and the external images.

As another example, the electronic apparatus 10 may acquire, from the external vehicle, additional images previously photographed corresponding to the obstructed sight. Further, the electronic apparatus 10 may generate a sight securing image by compositing at least part of the external images, at least part of the additional images, and at least part of the external vehicle images.

As another example, when the external vehicle is the first external vehicle and the external images photographed by the first external vehicle is the first external image, the electronic apparatus 10 may acquire the second external images photographed by the second external vehicle positioned in front of the first external vehicle. The electronic apparatus 10 may acquire the second external images from the first external vehicle or the second external vehicle. Further, the electronic apparatus 10 may generate a sight securing image by compositing at least part of the first external images, at least part of the second external images and at least part of the first external vehicle images.

The electronic apparatus 10 may provide the generated sight securing image to the display, at S1409. For example, the electronic apparatus 10 may provide the sight securing image to the transparent display positioned at the front of the vehicle so that the sight securing image is displayed according to the AR method.

The method according to an example embodiment may be implemented as program instructions that can be performed through various computer means (e.g., a processor) and may be recorded on computer readable recording medium. The computer readable recording medium may include singular or combination of program instructions, data files, data structures, and so on. Program instructions recorded on the medium may be designed and configured especially for the embodiments of the present disclosure, or may be already known and available to a person skilled in the computer software field. Examples of the computer readable recording medium may include magnetic media such as hard disk, floppy disk, and magnetic tape, optical media such as CD-ROM and DVD, magneto-optical media such as floptical disk, and hardware devices such as ROM, RAM, flash memory or the like which are especially configured to store and perform the program instructions. Examples of program instructions include not only machine language code such as those generated by a compiler, but also high-level language code that can be executed by a computer using an interpreter, and so on.

The present disclosure has been described in detail with reference to various example embodiments thereof. However, it should be understood that the detailed description and various examples, while indicating example embodiments of the disclosure, are given by way of illustration only, since various changes and modifications within the scope of the disclosure will become apparent to those skilled in the art from this detailed description.

What is claimed is:

1. A method for providing a sight securing image to a vehicle, comprising:
   identifying a region occupied by an external vehicle among an entire region of a display of the vehicle;
   determining whether to transmit a signal requesting an external image to the external vehicle, the external image to be generated by a camera included in the external vehicle, based on whether a ratio of the identified region to the entire region is no less than a predetermined ratio, and transmitting the signal requesting the external image to the external vehicle when it is determined that the ratio of the identified region to the entire region is equal to or greater than the predetermined ratio;
   in response to transmitting the signal, obtaining the external image from the external vehicle;
   obtaining an external vehicle image comprising the external vehicle, the external vehicle image being generated by a camera included in the vehicle;
   generating the sight securing image by overlapping at least part of the obtained external image and at least part of the obtained external vehicle image; and
   providing the generated sight securing image through the display.

2. The method of claim 1, wherein the obtaining the external image comprises obtaining the external image from the external vehicle or an externally located server.

3. The method of claim 1, wherein the providing to the display comprises providing the generated sight securing image to a transparent display positioned at a front of the vehicle and configured to display the generated sight securing image according to augmented reality method.

4. The method of claim 1, the external vehicle being identified based on at least one of: driving information of each of the plurality of external vehicles; distance information of each of the plurality of external vehicles; lane information of each of the plurality of external vehicles; the ratio of the identified region to the entire region; and identification information of each of the plurality of external vehicles.

5. The method of claim 1, further comprising providing range information of a range corresponding to a view obstructed by the external vehicle to the external vehicle or to an externally located server to obtain the external image.

6. The method of claim 1, wherein the generating a sight securing image comprises generating the sight securing image by overlaying at least part of the external vehicle image and at least part of the external image based on common environment information included in both of the external vehicle image and the external image.

7. The method of claim 1, wherein the method further comprises:
   based on a user input to remove the sight securing image being received, remove the sight securing image.

8. The method of claim 1, wherein generating the sight securing image further comprises:
   obtaining, from an external device, a previous additional image corresponding to the obstructed sight; and
   generating the sight securing image by compositing at least part of the external image, at least part of the previous additional image, and at least part of the external vehicle image.

9. The method of claim 1, wherein, when the external vehicle is a first external vehicle and the external image obtained at the first external vehicle is a first external image, the method further comprising obtaining a second external image obtained at a second external vehicle positioned in front of the first external vehicle, and wherein the generating the sight securing image comprises generating the sight securing image by compositing at least part of the first external image, at least part of the second external image and at least part of the external vehicle image.

10. The method of claim 9, wherein the obtaining the second external image comprises obtaining the second external image from the first external vehicle or the second external vehicle.

11. An electronic apparatus configured to provide a sight securing image to a vehicle, comprising:
   a processor comprising processing circuitry configured to:
   identify a region occupied by an external vehicle among an entire region of a display of the vehicle;
   determine whether to transmit a signal requesting an external image to the external vehicle, the external image being generated by a camera included in the external vehicle, based on whether a ratio of the identified region to the entire region is no less than a predetermined ratio, and transmit the signal requesting an external image to the external vehicle when it is determined that the ratio of the identified region to the entire region is equal to or greater than the predetermined ratio;

in response to transmitting the signal, obtain the external image from the external vehicle;

obtain an external vehicle image comprising the external vehicle, the external vehicle image being generated by a camera included in the vehicle;

generate the sight securing image by overlapping at least part of the obtained external image and at least part of the obtained external vehicle image; and provide the generated sight securing image through the display.

12. The electronic apparatus of claim 11, wherein the processor is configured to obtain the external image at the external vehicle from the external vehicle or an externally located server.

13. The electronic apparatus of claim 11, wherein the processor is configured to provide the generated sight securing image to a transparent display positioned at a front of the vehicle, the transparent display configured to display the generated sight securing image according to augmented reality method.

14. The electronic apparatus of claim 11, wherein the processor is configured to identify the external vehicle based on at least one of: driving information of each of the plurality of external vehicles; distance information of each of the plurality of external vehicles; lane information of each of the plurality of external vehicles; the ratio of the identified region to the entire region; and identification information of each of the plurality of external vehicles.

15. The electronic apparatus of claim 11, wherein the processor is further configured to provide range information of a range corresponding to a view obstructed by the external vehicle to the external vehicle and/or to an externally located server to obtain the external image.

16. The electronic apparatus of claim 11, wherein the processor is configured to generate the sight securing image by overlaying at least part of the external vehicle image and at least part of the external image based on common environment information included in both of the external vehicle image and the external image.

17. The electronic apparatus of claim 11, wherein the processor is further configured to remove the sight securing image based on a user input to remove the sight securing image being received.

18. The electronic apparatus of claim 11, wherein the processor is further configured to obtain, from an external device, a previously obtained additional image corresponding to the obstructed view, and the processor is configured to generate the sight securing image by compositing at least part of the external image, at least part of the additional image, and at least part of the external vehicle image.

19. The electronic apparatus of claim 11, wherein, when the external vehicle is a first external vehicle and the external image obtained at the first external vehicle is a first external image, the processor is configured to obtain a second external image obtained at a second external vehicle positioned in front of the first external vehicle, and the processor is configured to generate the sight securing image by compositing at least part of the first external image, at least part of the second external image and at least part of the first external vehicle image.

20. A vehicle, comprising:

a display;

a communicator comprising communication circuitry;

a camera configured to obtain an external vehicle image comprising an external vehicle by capturing the external vehicle;

an electronic apparatus comprising processing circuitry configured to:

identify a region occupied by the external vehicle among an entire region of the display of the vehicle;

determine whether to transmit a signal requesting an external image to the external vehicle, the external image being generated by a camera included in the external vehicle, based on whether a ratio of the identified region to the entire region is no less than a predetermined ratio, and transmit the signal requesting an external image to the external vehicle when it is determined that the ratio of the identified region to the entire region is equal to or greater than the predetermined ratio, in response to transmitting the signal, receive the external image from the external vehicle, generate a sight securing image by overlapping the obtained external image and the obtained external vehicle image, and control the display to display the generated sight securing image.

* * * * *